US010543642B2

(12) United States Patent
Lee

(10) Patent No.: US 10,543,642 B2
(45) Date of Patent: Jan. 28, 2020

(54) 3D PRINTER HAVING DUAL STAGE STRUCTURE

(71) Applicant: Foundation of Soongsil University-Industry Cooperation, Seoul (KR)

(72) Inventor: Dong Hun Lee, Gyeonggi-do (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 15/913,404

(22) Filed: Mar. 6, 2018

(65) Prior Publication Data

US 2018/0194062 A1    Jul. 12, 2018

Related U.S. Application Data

(62) Division of application No. 14/801,416, filed on Jul. 16, 2015, now Pat. No. 10,118,340.

(30) Foreign Application Priority Data

Jan. 19, 2015  (KR) .................. 10-2015-0008761
Feb. 10, 2015  (KR) .................. 10-2015-0020296
Apr. 17, 2015  (KR) .................. 10-2015-0054503

(51) Int. Cl.
  *B29C 64/241*    (2017.01)
  *B29C 64/35*    (2017.01)
  (Continued)

(52) U.S. Cl.
  CPC ............ *B29C 64/35* (2017.08); *B29C 64/106* (2017.08); *B29C 64/118* (2017.08);
  (Continued)

(58) Field of Classification Search
  None
  See application file for complete search history.

(56) References Cited

U.S. PATENT DOCUMENTS 5,340,433 A  *  8/1994  Crump .................. B22F 3/115
                                              156/578
5,401,128 A  *  3/1995  Lindem ................ B23Q 1/015
                                              408/1 R
(Continued)

FOREIGN PATENT DOCUMENTS

CN     203739245 U    7/2014
DE      4422146 A1    1/1996
(Continued)

OTHER PUBLICATIONS

VDX. 'Combination of FDM and Milling'. RepRap [online]. Feb. 9, 2008. [retrieved on Jan. 22, 2019]. (Year: 2008).*
(Continued)

*Primary Examiner* — Seyed Masoud Malekzadeh
*Assistant Examiner* — Manley L Cummins, IV
(74) *Attorney, Agent, or Firm* — Fitch, Even, Tabin & Flannery LLP

(57) ABSTRACT

A 3D printer has a dual stage structure and includes: a frame; an extrusion unit having a nozzle configured to extrude a raw material; a stacking base unit positioned under the extrusion unit and configured to receive the raw material on a surface thereof so that an object is formed in a layer-by-layer manner on the surface; and a cutting unit positioned between the stacking base unit and the extrusion unit and configured to grind or cut the object formed on the surface of the stacking base unit, wherein the frame is configured to be connected to outer sides of the stacking base unit, the extrusion unit, and the cutting unit, the stacking base unit and the cutting unit are configured to be vertically movable
(Continued)

along the frame, and the nozzle is configured to be movable on a plane.

8 Claims, 53 Drawing Sheets

(51) Int. Cl.
| | | |
|---|---|---|
| *B29C 64/245* | (2017.01) | |
| *B29C 64/188* | (2017.01) | |
| *B29C 64/118* | (2017.01) | |
| *B29C 64/106* | (2017.01) | |
| *B29C 64/20* | (2017.01) | |
| B33Y 30/00 | (2015.01) | |
| B33Y 40/00 | (2015.01) | |

(52) U.S. Cl.
CPC .......... *B29C 64/188* (2017.08); *B29C 64/20* (2017.08); *B29C 64/241* (2017.08); *B29C 64/245* (2017.08); B33Y 30/00 (2014.12); B33Y 40/00 (2014.12)

(56) References Cited

U.S. PATENT DOCUMENTS

| | | | | |
|---|---|---|---|---|
| 5,694,324 | A | 12/1997 | Master | |
| 6,135,683 | A | 10/2000 | Kim | |
| 6,153,034 | A * | 11/2000 | Lipsker | B29C 41/36 156/73.1 |
| 6,418,811 | B1 * | 7/2002 | Rosheim | B25J 17/0266 414/729 |
| 9,156,204 | B2 | 10/2015 | Knighton | |
| 9,283,671 | B2 * | 3/2016 | Cao | B25J 9/0036 |
| 9,815,221 | B1 | 11/2017 | Warnock | |
| 2002/0019683 | A1 * | 2/2002 | White | G05B 19/00 700/255 |
| 2002/0129485 | A1 | 9/2002 | Mok et al. | |
| 2003/0077139 | A1 * | 4/2003 | Chang | B23Q 1/012 409/201 |
| 2003/0090034 | A1 | 5/2003 | Mulhaupt | |
| 2004/0089980 | A1 | 5/2004 | Owada | |
| 2005/0248065 | A1 | 11/2005 | Owada | |
| 2006/0158456 | A1 * | 7/2006 | Zinniel | B33Y 30/00 345/589 |
| 2007/0295139 | A1 * | 12/2007 | Ota | B23Q 1/5462 74/490.07 |
| 2009/0025638 | A1 * | 1/2009 | Inoue | A61C 13/0019 118/712 |
| 2010/0206224 | A1 | 8/2010 | Thurner et al. | |
| 2012/0281239 | A1 * | 11/2012 | White | G01B 11/24 356/601 |
| 2014/0265034 | A1 | 9/2014 | Dudley | |
| 2015/0021830 | A1 * | 1/2015 | Yerazunis | B33Y 10/00 264/401 |
| 2015/0069665 | A1 * | 3/2015 | Lee | G05B 19/4099 264/405 |
| 2015/0273768 | A1 | 10/2015 | Wyatt et al. | |
| 2015/0298393 | A1 | 10/2015 | Suarez | |
| 2015/0300036 | A1 * | 10/2015 | Khoshnevis | E04G 21/0463 425/63 |
| 2016/0096329 | A1 | 4/2016 | Ko et al. | |
| 2016/0136759 | A1 * | 5/2016 | Broda | B22F 3/1055 219/76.1 |
| 2016/0144567 | A1 | 5/2016 | Muller et al. | |
| 2016/0297097 | A1 * | 10/2016 | Riman | C04B 35/46 |
| 2016/0297149 | A1 * | 10/2016 | Albert | G05B 19/4099 |

FOREIGN PATENT DOCUMENTS

| | | |
|---|---|---|
| JP | 2011-26668 A | 2/2011 |
| KR | 10-1999-0028178 A | 4/1999 |
| KR | 10-1999-0084559 A | 12/1999 |
| KR | 102014-0036285 A | 3/2014 |
| WO | 02073324 A2 | 9/2002 |

OTHER PUBLICATIONS

Tornadoboy. 'Idea =Extruder/Mill Head'. RepRap [online]. May 25, 2009. [retrieved on Jan. 22, 2019]. (Year: 2009).*

Shinko LTD. '—Precision Prototying Process by Injection welding/ Milling' online] Feb. 2, 1998. [retrieved on Jan. 22, 2019]. Retrieved from the Internet: <https://web.archive.org/web/19980202063248/ http:// (Year: 1998).*

Main.ZachSmith.'RepRapOneDarwin'. RepRap [online]. Feb. 1, 2007. [retrieved on Jan. 22, 2019]. Retrieved from the Internet: < https://reprap.org/wiki/RepRapOneDarwin>. (Year: 2007).*

Korean Office Action dated Sep. 4, 2015, for Korean Patent Application No. 10-2015-0054503. (6 pages).

Chinese Office Action dated May 2, 2017, for Chinese Patent Application No. 201580006161.4. (10 pages).

* cited by examiner

3D PRINTER HAVING DUAL STAGE STRUCTURE

CROSS-REFERENCE TO A RELATED APPLICATIONS

This application is a divisional of U.S. application Ser. No. 14/801,416, filed Jul. 16, 2015, which claims the benefit of Korean Patent Application No. 10-2015-0008761, filed on Jan. 19, 2015, Korean Patent Application No. 10-2015-0020296, filed on Feb. 10, 2015, and Korean Patent Application No. 10-2015-0054503, filed on Apr. 17, 2015, with the Korean Intellectual Property Office, the entire contents of which are incorporated herein by reference.

BACKGROUND

1. Field

One or more exemplary embodiments relate to a 3D printer having a dual stage structure, and more particularly, to a 3D printer having a dual stage structure including an extrusion unit and a cutting unit that are disposed above a stacking base unit with a variable distance between the extrusion unit and the cutting unit and a variable distance between the cutting unit and the stacking base unit so that a cutting or grinding operation may be simultaneously performed with a layering operation.

2. Description of the Related Art

Recently, 3D printers have been used in various fields and are highly considered for many applications. In the past one or two years, 3D printers have become very popular in Korea and available for purchase at shops such as Internet shopping malls. In other countries, 3D printers are even referred to as the new industrial revolution printers due to the ripple effect thereof and much attention has been given thereto.

Although the technology for 3D printers has been rapidly developed, it is still difficult to precisely form objects into desired shapes by using such 3D printers. Also, the speed of these 3D printers relatively low. Since 3D printers create objects in a layer-by-layer manner by using a raw material, stair-shaped portions are usually formed between layers of the objects, and thus, additional cutting or grinding processes may be necessary to remove the stair-shaped portions.

Therefore, after the objects are formed in a layer-by-layer manner by using a raw material, a cutting process is generally performed as a separate process. In this case, additional time and costs are incurred. Therefore, 3D printer capable of creating an object in a layer-by-layer manner and simultaneously performing a cutting process on the object is needed.

RELATED ART DOCUMENT

[Patent Document] Korean Patent Application Laid-open Publication No.: 10-2014-0036285

SUMMARY

One or more exemplary embodiments include a 3D printer having a dual stage structure including an extrusion unit and a cutting unit that are disposed above a stacking base unit with a variable distance between the extrusion unit and the cutting unit and a variable distance between the cutting unit and the stacking base unit so that a cutting or grinding operation may be simultaneously performed with a layering operation.

Additional aspects will be set forth in part in the description which follows and, in part, will be apparent from the description, or may be learned by practice of the presented embodiments.

According to one or more exemplary embodiments, a 3D printer having a dual stage structure includes: an extrusion unit configured to extrude a raw material; a stacking base unit positioned under the extrusion unit and configured to receive the raw material on an upper surface thereof so that an object is formed on the upper surface of the stacking base unit in a layer-by-layer manner; and a cutting unit between the stacking base unit and the extrusion unit and configured to grind or cut the object formed on the upper surface of the stacking base unit, wherein a distance between the extrusion unit and the cutting unit and a distance between the cutting unit and the stacking base unit are variable relative to each other.

The 3D printer may further include a frame positioned outside the extrusion unit, the cutting unit, and the stacking base unit, wherein the frame may extend vertically and may be configured to be connected to one or more of the extrusion unit, the cutting unit, and the stacking base unit, and the one or more of the extrusion unit, the cutting unit, and the stacking base unit may be configured to be vertically movable along the frame.

The frame may include a plurality of vertically-extending main guide beams, main guide rails may be respectively formed on inner sides of the main guide beams, and main guide parts may be configured to be respectively connected to the main guide rails to be positioned on outer portions of the one or more of the extrusion unit, the cutting unit, and the stacking base unit, wherein the one or more of the extrusion unit, the cutting unit, and the stacking base unit may be configured to be vertically movable along the main guide rails.

The frame may further include: an outer frame including a plurality of outer guide beams arranged in a circular shape; and a rotatable frame including one or more rotatable guide beams arranged inside a circle formed by the outer guide beams, wherein the cutting unit may be configured to be connected to an inner side of the rotatable frame, the rotatable guide beams may be configured to extend vertically such that the cutting unit may be vertically movable along the rotatable guide beams, and the rotatable frame may be configured to be rotatable inside the outer frame around a center of the circle formed by the outer guide beams such that the cutting unit may be movable.

The rotatable frame may further include a ring-shaped connection part configured to be connected to lower portions of the rotatable guide beams and to be concentric with the circle formed by the outer guide beams, the outer frame may further include a cylindrical connection part configured to connect lower portions of the outer guide beams and to be inserted into the ring-shaped connection part, and the ring-shaped connection part may be configured to be rotatable on the cylindrical connection part to rotate the rotatable frame.

The stacking base unit may include a height adjusting device positioned on the cylindrical connection part under the stacking base unit and the height adjusting device may be configured to modify a height of the stacking base unit.

The stacking base unit may include: a first jig having a certain area; and a bed positioned on top of the first jig and configured to to receive the raw material extruded from the extrusion unit, wherein a plurality of support holes may be formed in the bed.

The bed may include first to third build plates that have certain areas and are sequentially stacked, the first to third build plates may include first to third support holes, respectively, and the first to third build plates may be configured to be individually movable in a horizontal direction to align or misalign the first to third support holes in a vertical direction.

The 3D printer may further include a height adjusting device on a lower portion of the first jig and configured to vertically move the first jig.

The height adjusting device may have a variable vertical length so as to vertically move the first jig and the bed.

First main guide parts may be positioned on outer portions of the first jig and may be connected to the main guide rails such that the first jig may be vertically movable along the main guide rails.

The extrusion unit may include: a second jig connected to the frame and including a space therein; and an extrusion device positioned in the space, wherein the second jig may include a first guide beam positioned in the space and configured to extend in at least one direction, the extrusion device may include a second guide beam configured to be connected to the first guide beam and extend in a direction perpendicular to the first guide beam, the second guide beam being movable along the first guide beam in the direction in which the first guide extends, and a nozzle may be connected to the second guide beam and movable along the second guide beam in the direction in which the second guide beam extends.

The second jig may further include third main guide parts configured to be connected to the main guide rails such that the second jig may be movable along the main guide rails.

The cutting unit may include: a third jig including second main guide parts and having a space therein, the second main guide parts being formed on outer portions of the third jig and being configured to be connected to the main guide rails such that the third jig may be vertically movable along the main guide rails; a cutting device positioned in the space of the third jig; and a connection unit configured to connect the third jig and the cutting device, wherein the connection unit may include one or more legs having a variable structure such that the cutting device may be movable in the space of the third jig.

The third jig may further include an inner guide rail formed along an inner circumference of the third jig, the connection unit may further include an inner guide part configured to be connected to the inner guide rail and movable along the inner guide rail, the one or more legs may be configured to be connected to the inner guide part, and the cutting device may be configured to move in the space of the third jig according to a movement of the inner guide part.

The third jig may have a ring shape with a predetermined radius of curvature such that the space therein has a circular shape, the inner guide rail may be formed along the inner circumference of the third jig and may have a predetermined radius of curvature, and the inner guide part may have a radius of curvature the same as the radius of curvature of the inner guide rail such that the inner guide part may be movable along the inner guide rail.

Each of the one or more legs may include a single link or a plurality of links connected in series, the single link or the plurality of links may be configured to extend to a predetermined length and connect the inner guide part and the cutting device, and ends of the plurality of links may be configured to be connected to each other and rotatable on a plane within the space of the third jig such that the cutting device may be movable on the plane.

Three legs may be provided, and the three legs may be configured to be connected in parallel by connecting ends of the three legs to the cutting device and the other ends of the three legs to the inner guide part.

The connection unit may include a first leg, a second leg, and a third leg, the second leg may be positioned between the first and third legs, the first leg may include a first link and a second link configured to be rotatably connected to each other via a hinge, the second leg may include a third link, and the third leg may include a fourth link and a fifth link configured to be rotatably connected to each other via a hinge.

At least one of the one or more legs may have a variable length such that the cutting device may be movable in the space of the third jig.

The cutting unit may include: a ring-shaped jig having a center axis, a radius, and a space therein; a plurality of brackets configured to be connected to outer portions of the ring-shaped jig in radial directions of the ring-shaped jig so as to allow rotation of the ring-shaped jig around the center axis; a cutting device disposed in the space of the ring-shaped jig; and a connection unit configured to connect the ring-shaped jig and the cutting device, wherein the brackets may be configured to be respectively connected to the main guide beams and may include second main guide parts formed on outer portions of the brackets and configured to be connected to the main guide rails such that the brackets may be vertically movable along the main guide rails, and the connection unit may include one or more legs having a variable structure such that the cutting device may be movable in the space of the ring-shaped jig.

The brackets may further include curved guide rails formed in inner portions of the brackets for connection with the ring-shaped jig, and the curved guide rails may have a radius of curvature that is the same as that of the ring-shaped jig such that the ring-shaped jig may be rotatable along the curved guide rails.

Each of the one or more legs may include a single link or a plurality of links configured to be connected in series, the single link or the plurality of links extending a predetermined length and connecting the ring-shaped jig and the cutting device, and ends of the plurality of links may be configured to be connected to each other and rotatable on a plane within the space of the ring-shaped jig such that the cutting device may be movable on the plane.

Three legs may be provided, and the three legs may be configured to be connected in parallel by connecting ends of the three legs to the cutting device and the other ends of the three legs to the ring-shaped jig.

The connection unit may include a first leg, a second leg, and a third leg, the second leg may be positioned between the first and third legs, the first leg may include a first link and a second link configured to be rotatably connected through a hinge, the second leg may include a third link, and the third leg may include a fourth link and a fifth link configured to be rotatably connected using a hinge.

At least one of the one or more legs may have a variable length such that the cutting device may be movable in the space.

The cutting device may further include: a housing configured to be connected to the one or more legs; and a cutting tool configured to be connected to the housing, wherein the cutting tool configured to be connected to the housing may be rotatable upward and downward around an axis parallel with the plane on which the links are rotatable.

The cutting device may further include: a cutting bit; and an air blower configured to blow air.

The frame may include a plurality of vertically-extending main guide beams, wherein the plurality of vertically-extending main guide beams may be four in number and arranged in a tetragonal shape, the stacking base unit may be configured to be connected to some of the vertically-extending main guide beams, the cutting unit may be configured to be connected to the remaining ones of the vertically-extending main guide beams, and the stacking base unit and the cutting unit may be configured to be vertically movable along the main guide rails.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
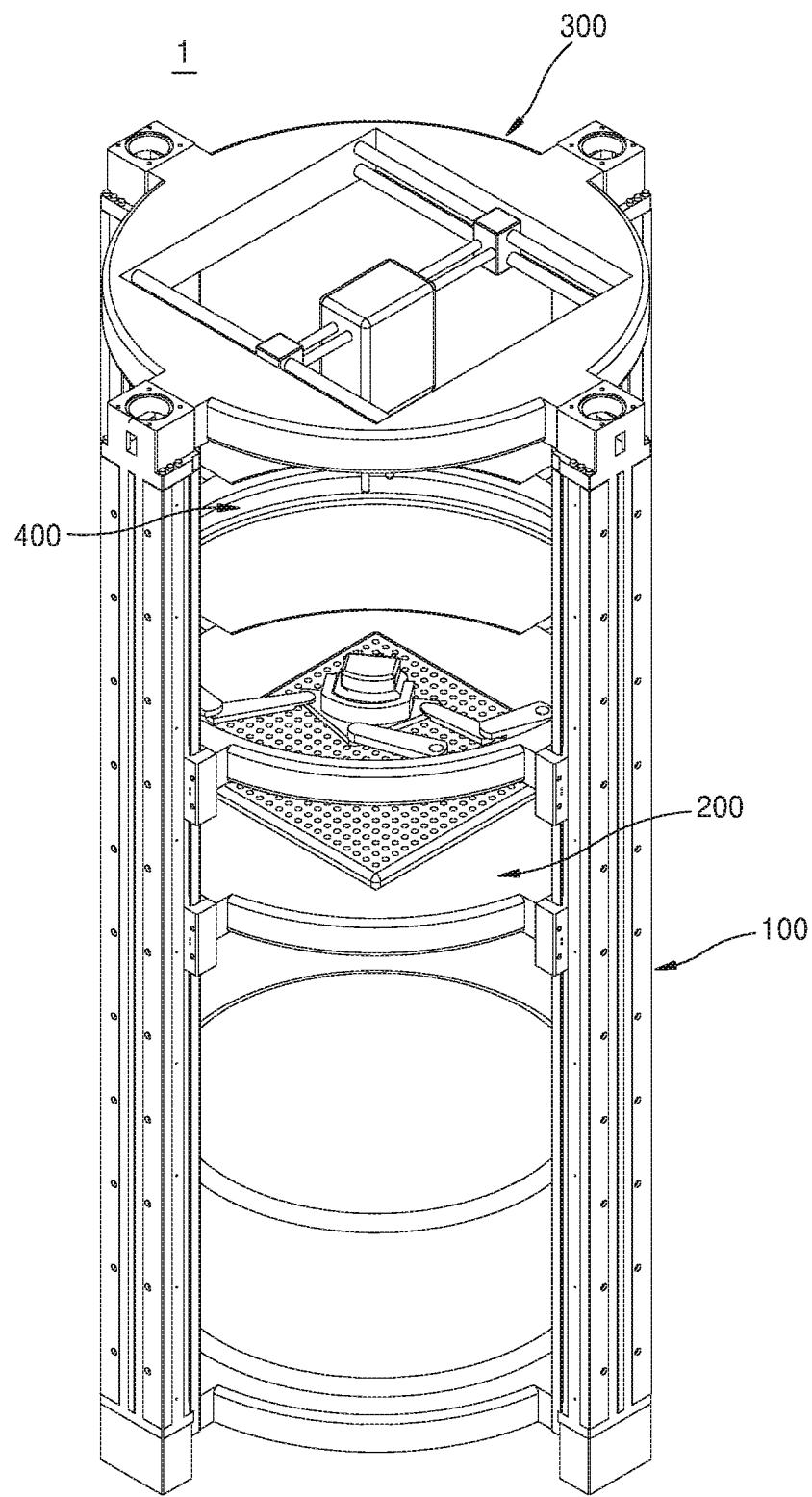
FIGS. 1 and 2 illustrate a 3D printer having a dual stage structure according to an exemplary embodiment.

Advantages and features of exemplary embodiments, and implementation methods thereof will be clarified through the following descriptions given with reference to the accompanying drawings. The embodiments may, however, have different forms and should not be construed as being limited to the descriptions set forth herein. Rather, these embodiments are provided so that this disclosure will be thorough and complete, and will fully convey the scope of the inventive concept to those skilled in the art. Therefore, the scope of the inventive concept should be defined by the following claims. Throughout the present disclosure, like reference numerals denote like elements.

Spatially relative terms, such as "below", "beneath", "lower", "above", "upper", "side", "lateral", and the like, may be used herein for ease of description to describe one member or element's relationship to another member(s) or element(s) as illustrated in the drawings. It will be understood that the spatially relative terms are intended to encompass different orientations of a member in use or operation in addition to the orientation depicted in the drawings. For example, if members in the drawings are turned over, a member described as being "above" another member would then be described as being "under" the other member. Therefore, the term "above" may be construed as "above" or "under." Members may be otherwise oriented, and then the spatially relative terms may be interpreted accordingly.

In the following description, the technical terms are used only for explaining exemplary embodiments, and not for purposes of limitation. The terms of a singular form may include plural forms unless specifically mentioned. The meaning of "comprises" and/or "comprising" specifies an element, a step, a process, an operation, and/or a member but does not exclude other elements, steps, processes, operations, and/or members.

Unless otherwise defined, all terms (including technical and scientific terms) used herein have the same meaning as commonly understood by those of ordinary skill in the art. It will be further understood that terms, such as those defined in commonly used dictionaries, will not be interpreted in an idealized or overly formal sense unless expressly so defined herein.

In the drawings, the thicknesses, sizes, or shapes of elements or parts are exaggerated, omitted, or schematically shown for ease and clarity of illustration. That is, the size and area of each element may be different from the actual size and area thereof.

In addition, directions mentioned while explaining structures are based on the drawings. Therefore, if the reference points of directions or positional relationships are not clearly mentioned in the following description, refer to the drawings.

Figure 2:
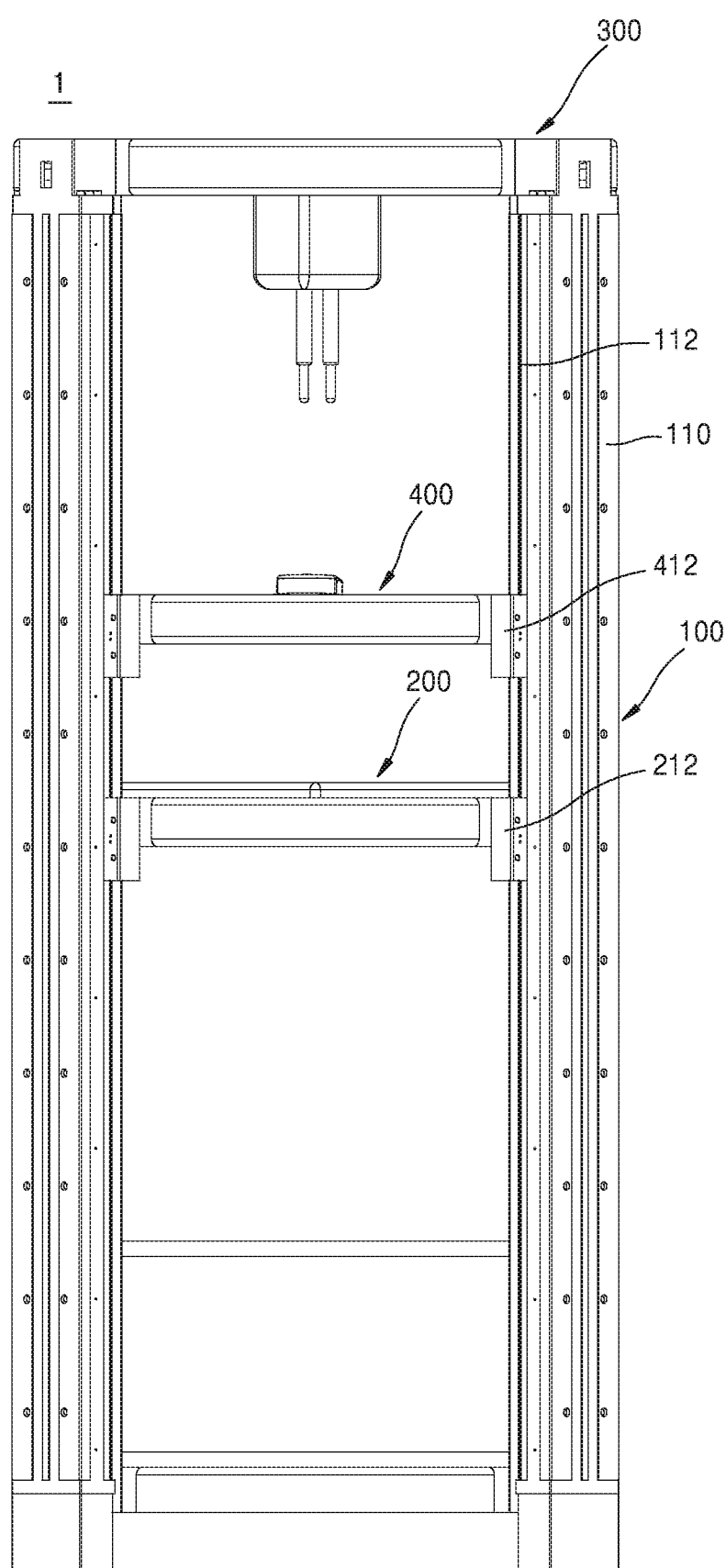

FIGS. 1 and 2 illustrate a 3D printer 1 having a dual stage structure according to an exemplary embodiment.

The 3D printer 1 having a dual stage structure of the exemplary embodiment includes: an extrusion unit 300 configured to extrude a raw material; a stacking base unit 200 disposed under the extrusion unit 300 to form an object layer-by-layer by receiving the raw material on an upper surface thereon; and a cutting unit 400 disposed between the stacking base unit 200 and the extrusion unit 300 and configured to grind or cut the object formed on the stacking base unit 200, wherein the distance between the distance between the extrusion unit 300 and the cutting unit 400 and the distance between the cutting unit 400 and the stacking base unit 200 are variable.

The raw material may be extruded via the extrusion unit 300. To this end, a supply device may be connected to the extrusion unit 300 so as to supply the raw material to the extrusion unit 300, and the extrusion unit 300 may include a nozzle 340 so as to extrude the raw material. The raw material may be a material such as a solid material, a gel, or a liquid material suitable for forming certain objects. However, the raw material is not limited thereto. The nozzle 340 may extrude the raw material so that layers of the raw material are stacked on the stacking base unit 200 (to be described in detail later). At this time, the position where the raw material is extruded in a layer-by-layer manner may be adjusted by moving the nozzle 340 of the extrusion unit 300 on a plane.

The stacking base unit 200 is disposed under the extrusion unit 300 and may have a shelf-like shape such that the raw material extruded from the extrusion unit 300 may be arranged layer-by-layer on the stacking base unit 200 to form an object.

The cutting unit 400 is disposed between the extrusion unit 300 and the stacking base unit 200. The cutting unit 400 cuts or grinds the object formed on the stacking base unit 200 while moving between the extrusion unit 300 and the stacking base unit 200.

The cutting unit 400 is disposed between the extrusion unit 300 and the stacking base unit 200. The cutting unit 400 cuts or grinds the object formed on the formation unit 200 while moving between the extrusion unit 300 and the stacking base unit 200.

The distance between the extrusion unit 300 and the cutting unit 400 and the distance between the cutting unit 400 and the stacking base unit 200 are variable. That is, when the raw material extruded from the extrusion unit 300 is arranged layer-by-layer on the stacking base unit 200, the distance between the extrusion unit 300 and the stacking base unit 200 is adjusted, and the cutting unit 400 may cut or grind the object while the cutting unit 400 moves between the extrusion unit 300 and the stacking base unit 200. In this manner, cutting or grinding of the object may be carried out simultaneously with extrusion and arranging of the raw material.

As described above, the 3D printer 1 of the exemplary embodiment has a dual stage structure. That is, the extrusion unit 300, the cutting unit 400, and the stacking base unit 200 are sequentially positioned in a downward direction, and the object formed by laying down the raw material on the stacking base unit 200 may be cut or ground by the cutting unit 400. Therefore, an laying operation and a cutting operation may be simultaneously carried out.

The extrusion unit 300, the stacking base unit 200, and the cutting unit 400 may be connected to and supported by a frame 100. In the following description, exemplary embodiments will be described according to the frame 100.

The frame 100 may be disposed outside the stacking base unit 200, the extrusion unit 300, and the cutting unit 400. The frame 100 may be connected to one or more of the stacking base unit 200, extrusion unit 300, and the cutting unit 400 and may vertically extend. Therefore, one or more of the stacking base unit 200, the extrusion unit 300, and the cutting unit 400 may vertically be movable along the cutting unit 400, and owing to the frame 100, the stacking base unit 200, the extrusion unit 300, and the cutting unit 400 may be properly positioned to perform a raw material extruding operation, a layer forming operation, and a cutting operation.

For example, according to an exemplary embodiment, the stacking base unit 200 and the cutting unit 400 may be vertically movable along the frame 100. In detail, as shown in FIGS. 1 and 2, the extrusion unit 300 is fixed to an upper portion of the frame 100 and extrudes the raw material, and the raw material is arranged on the stacking base unit 200 to form an object layer-by-layer. At this time, the stacking base unit 200 may be vertically moved to form the object into a target shape. In addition, the cutting unit 400 may cut and grind portions of the object while moving vertically.

At this time, when the vertical position of the extrusion unit 300 disposed at an upper position is fixed, the nozzle 340 is moved. The nozzle 340 may extrude the raw material at a certain position on a plane while moving along the plane. In addition, the stacking base unit 200 receives the raw material while moving vertically so that the object may be easily formed to have the target shape. Particularly, the nozzle 340 extruding the raw material has a fixed height and moves on a plane, and the stacking base unit 200 moves vertically. Thus, the 3D printer 1 may have a simple structure.

In the above-described embodiment, the stacking base unit 200 and the cutting unit 400 are vertically movable along the frame 100. However, the inventive concept is not limited thereto.

Figure 3:
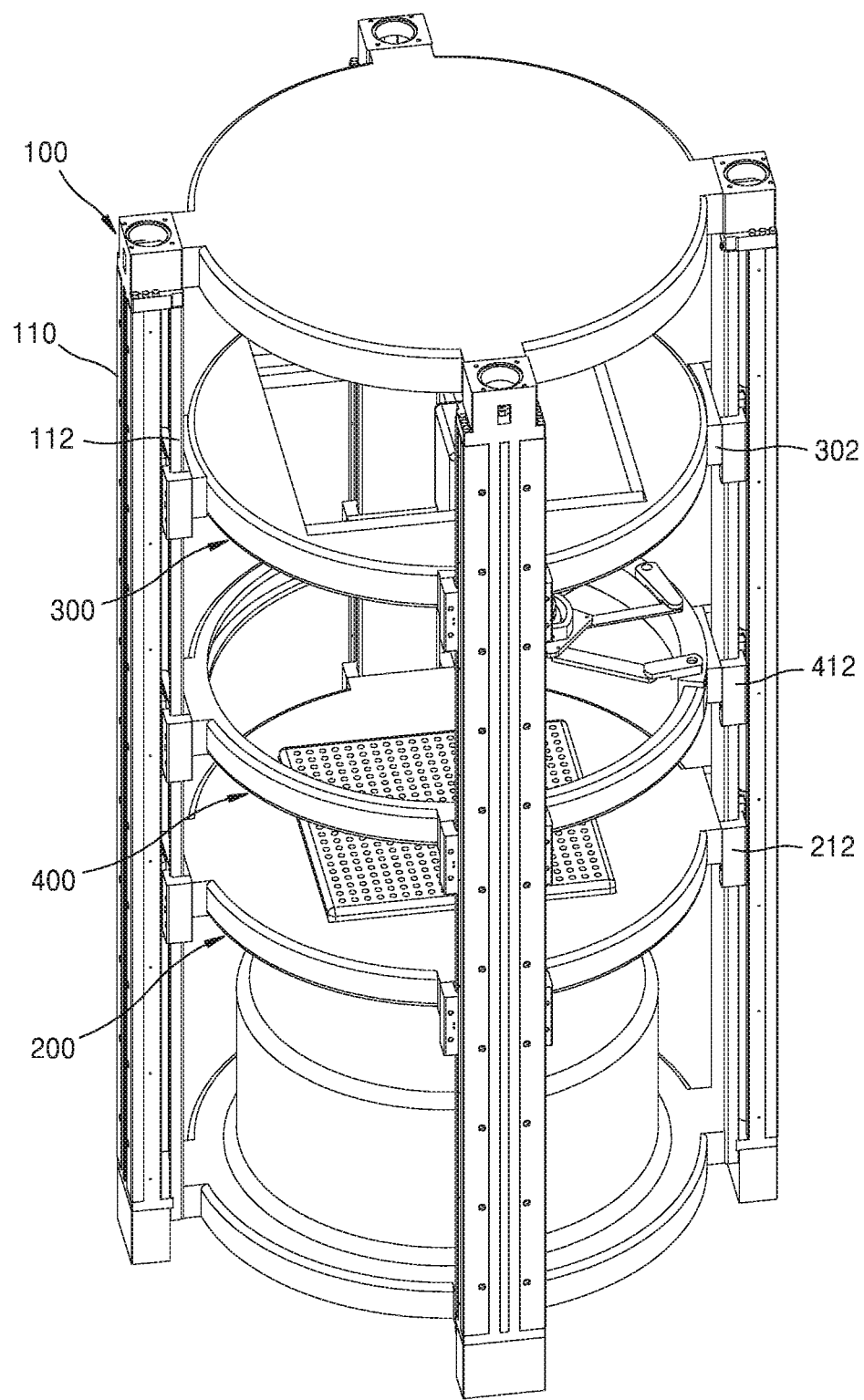
FIG. 3 illustrates the 3D printer having a dual stage structure according to another exemplary embodiment.

For example, according to another exemplary embodiment, all of the extrusion unit 300, the cutting unit 400, and the stacking base unit 200 may be connected to the frame 100 and vertically movable as shown in FIG. 3. In another exemplary embodiment, only the cutting unit 400 may be connected to the frame 100 in a vertically movable manner, and the stacking base unit 200 may be vertically moved by a separate height adjusting device.

In detail, according to the exemplary embodiment, the frame 100 is configured as follows. The frame 100 includes a plurality of vertically extending main guide beams 110, and vertically extending main guide rails 112 are respectively formed on inner sides of the main guide beams 110. Main guide parts respectively connected to the main guide rails 112 are disposed on an outer side of one or more of the stacking base unit 200, the extrusion unit 300, and the cutting unit 400. Therefore, one or more of the stacking base unit 200, the extrusion unit 300, and the cutting unit 400 are vertically movable along the main guide rails 112.

For example, as shown in FIGS. 1 and 2, four main guide beams 110 may be disposed in four directions. However, this is just an example and more or less than four main guide beams 110 may be used. The main guide beams 110 may be arranged in parallel with each other according to a predetermined arrangement manner.

Figure 4:
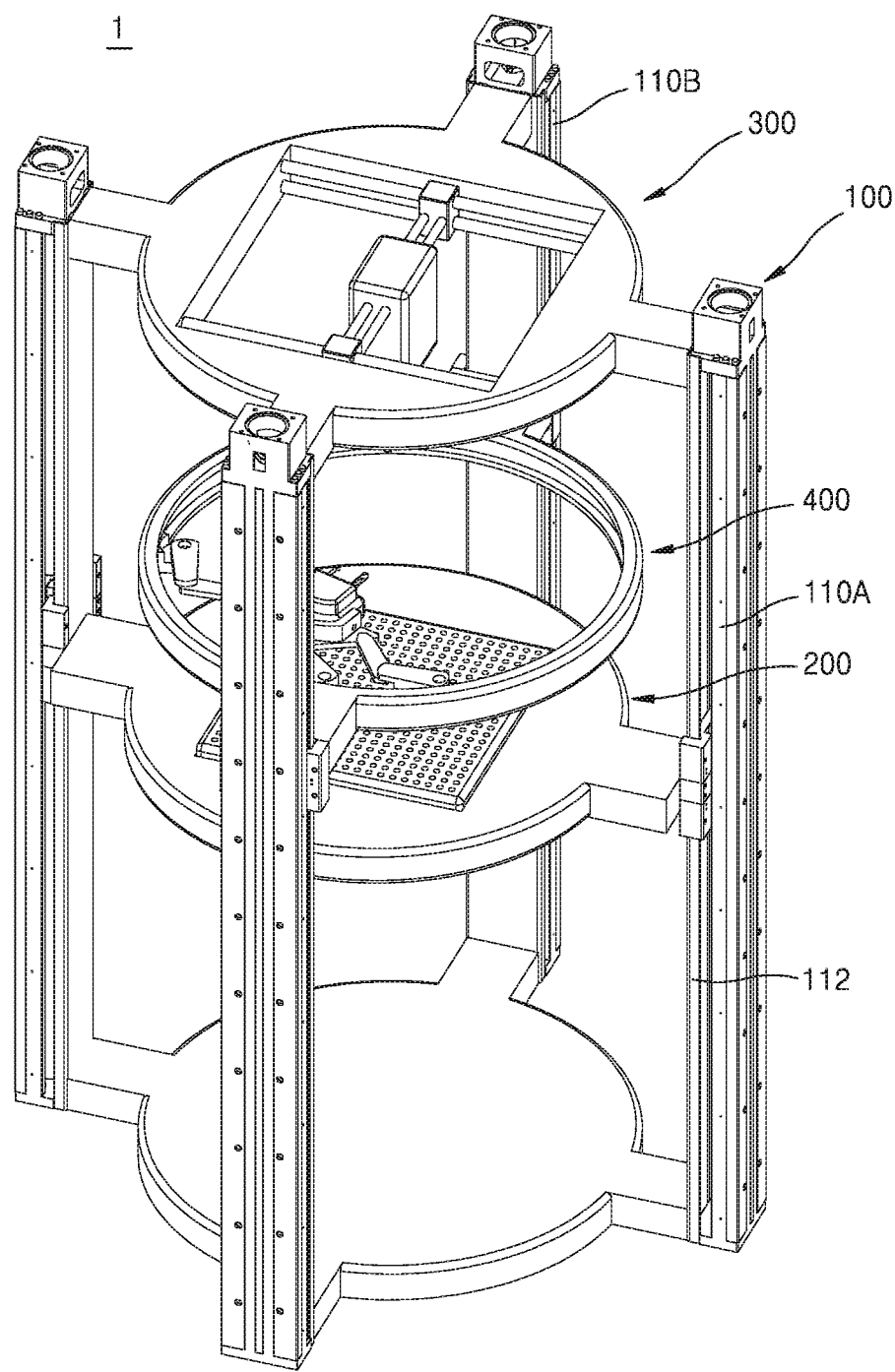
FIG. 4 illustrates the 3D printer having a dual stage structure according to another exemplary embodiment.

The configuration in which all the main guide beams 110 of the frame 100 are connected to the extrusion unit 300, the cutting unit 400, and the stacking base unit 200 is a non-limiting example. In an exemplary embodiment, as shown in FIG. 4, four main guide beams 110A and 110B may be arranged at four positions. Mutually-facing two (first main guide beams 110A) of the four main guide beams 110A and 110B may be connected to the stacking base unit 200, and the other mutually-facing two (second main guide beams 110B) of the four main guide beams 110A and 110B may be connected to the cutting unit 400. That is, the main guide beams 110 may be selectively connected to one or more of the extrusion unit 300, the cutting unit 400, and the stacking base unit 200.

The main guide rails 112 respectively formed on the main guide beams 110 extend in a vertical direction. In addition, the main guide parts connected to the main guide rails 112 are disposed on the outer side of one or more of the extrusion unit 300, the stacking base unit 200, and the cutting unit 400 to allow vertical movement of one or more of the stacking base unit 200, the extrusion unit 300, and the cutting unit 400 along the main guide rails 112. The main guide rails 112 and the main guide parts are not limited to particular structures as long as the main guide rails 112 and the main guide parts are connected to each other and allow guiding movements. For example, the main guide parts may be placed on the outer side of all of the stacking base unit 200, the extrusion unit 300, and the cutting unit 400, and the main guide parts of all, two, or one of the stacking base unit 200, the extrusion unit 300, and the cutting unit 400 may be connected to the main guide rails 112.

In addition, a driving device and a control device may be further used to move and stop the stacking base unit 200 and the cutting unit 400. Owing to the above-described structure, the stacking base unit 200, the extrusion unit 300, and the cutting unit 400 may be easily moved in a vertical direction along the main guide beams 110.

Figure 5:
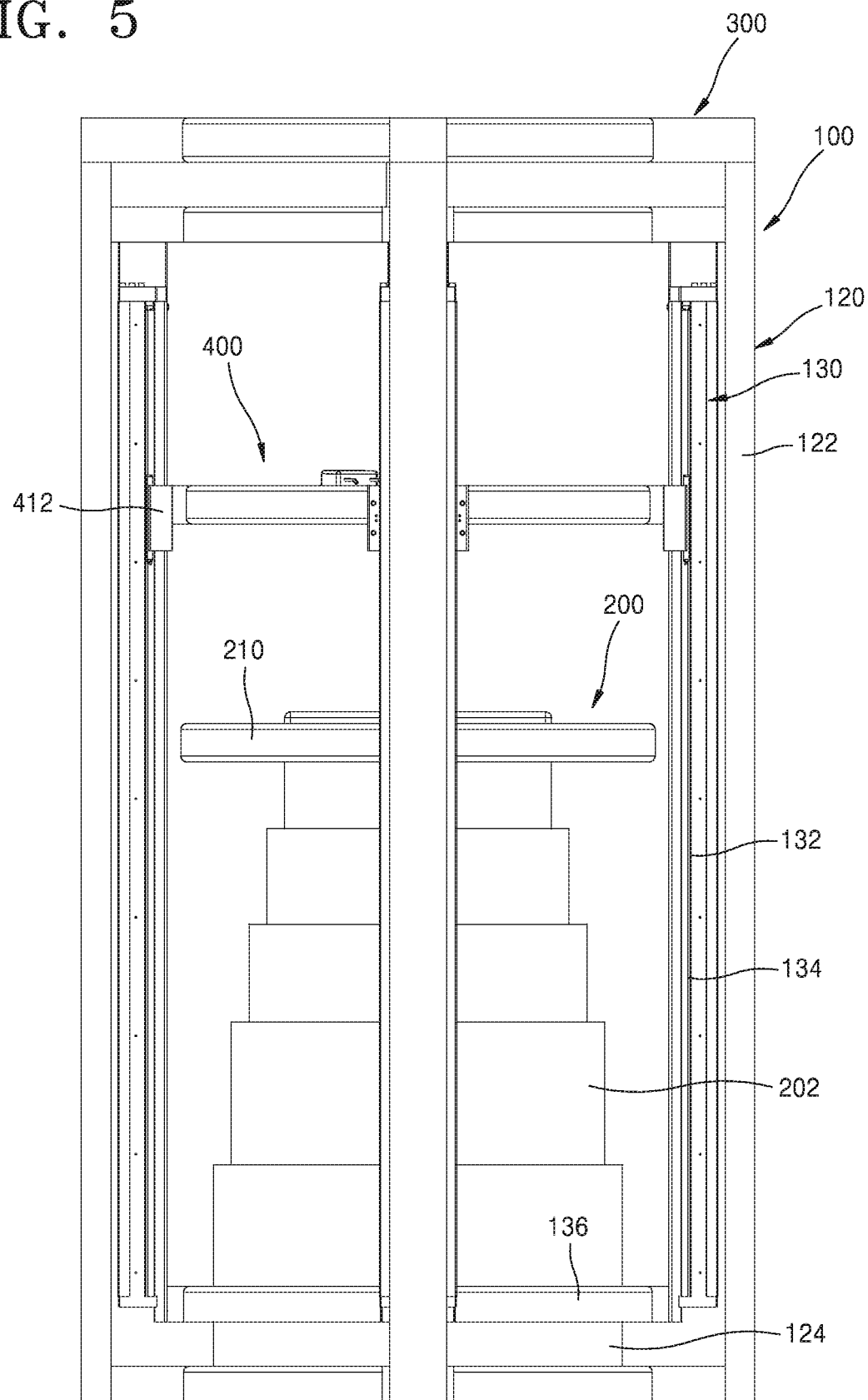
FIGS. 5 to 7 illustrate the 3D printer having a dual stage structure according to another exemplary embodiment.

An exemplary structure of the frame 100 will now be described according to another embodiment with reference to FIGS. 5 to 7.

For example, the frame 100 includes: an outer frame 120 having a plurality of outer guide beams 122 arranged in a circular shape; and a rotatable frame 130 having a plurality of rotatable guide beams 132 disposed inside a circle formed by the outer guide beams 122. The cutting unit 400 is connected to an inner side of the rotatable frame 130, and each of the rotatable guide beams 132 vertically extends so that the cutting unit 400 may be vertically moved along the rotatable frame 130. The rotatable frame 130 disposed inside the outer frame 120 is rotatable about the center of the circle formed by the outer guide beams 122. In this manner, the position of the cutting unit 400 is variable.

That is, according to the exemplary embodiment, the frame 100 is configured by the outer frame 120 and the rotatable frame 130 rotatably disposed inside the outer frame 120.

Figure 7:
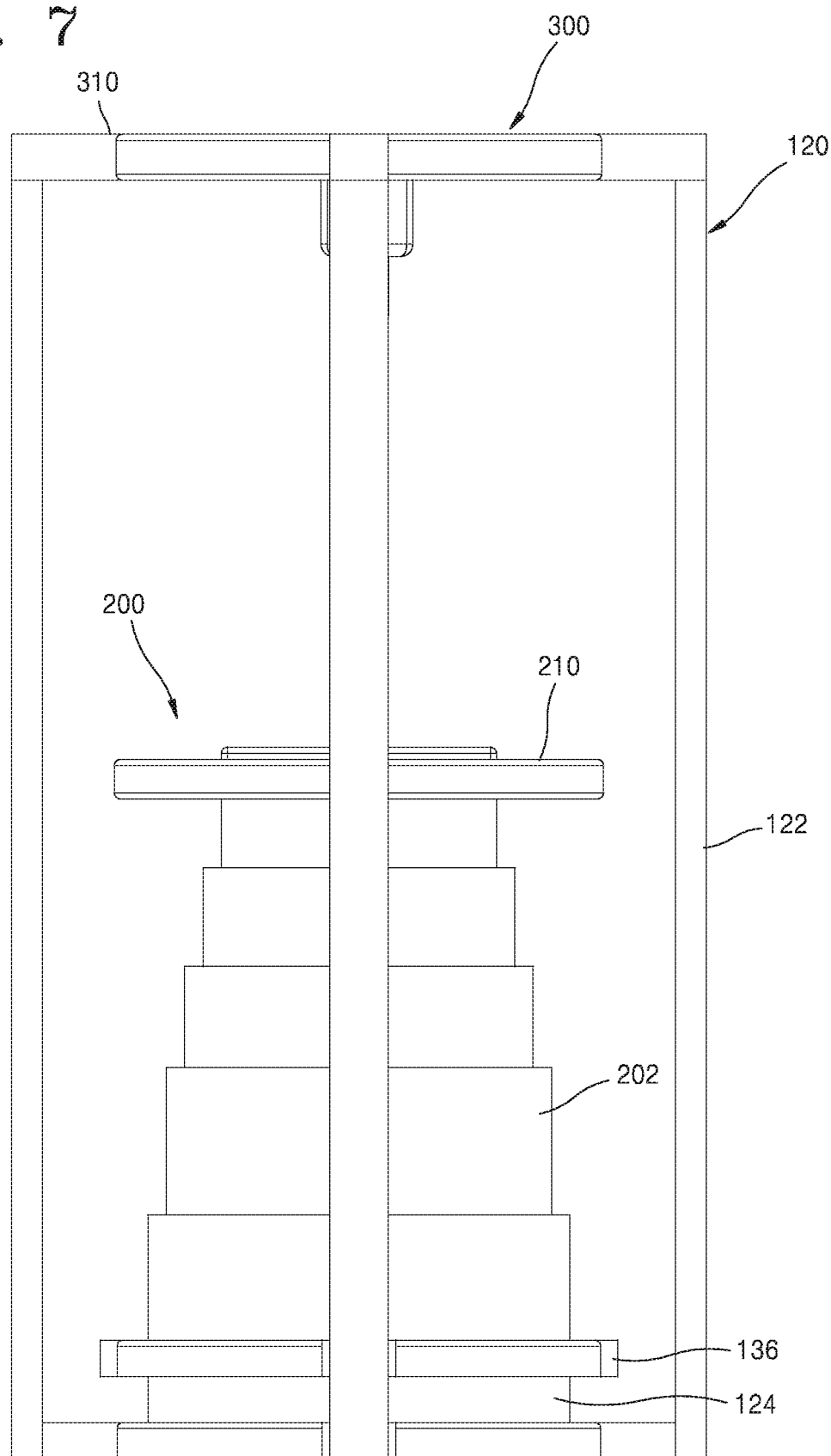

FIG. 7 illustrates the outer frame 120. The outer frame 120 includes the outer guide beams 122 arranged in a circular shape. That is, the outer guide beams 122 may be arranged along the circumference of a circle. Also, the outer frame 120 extends vertically.

Figure 6:
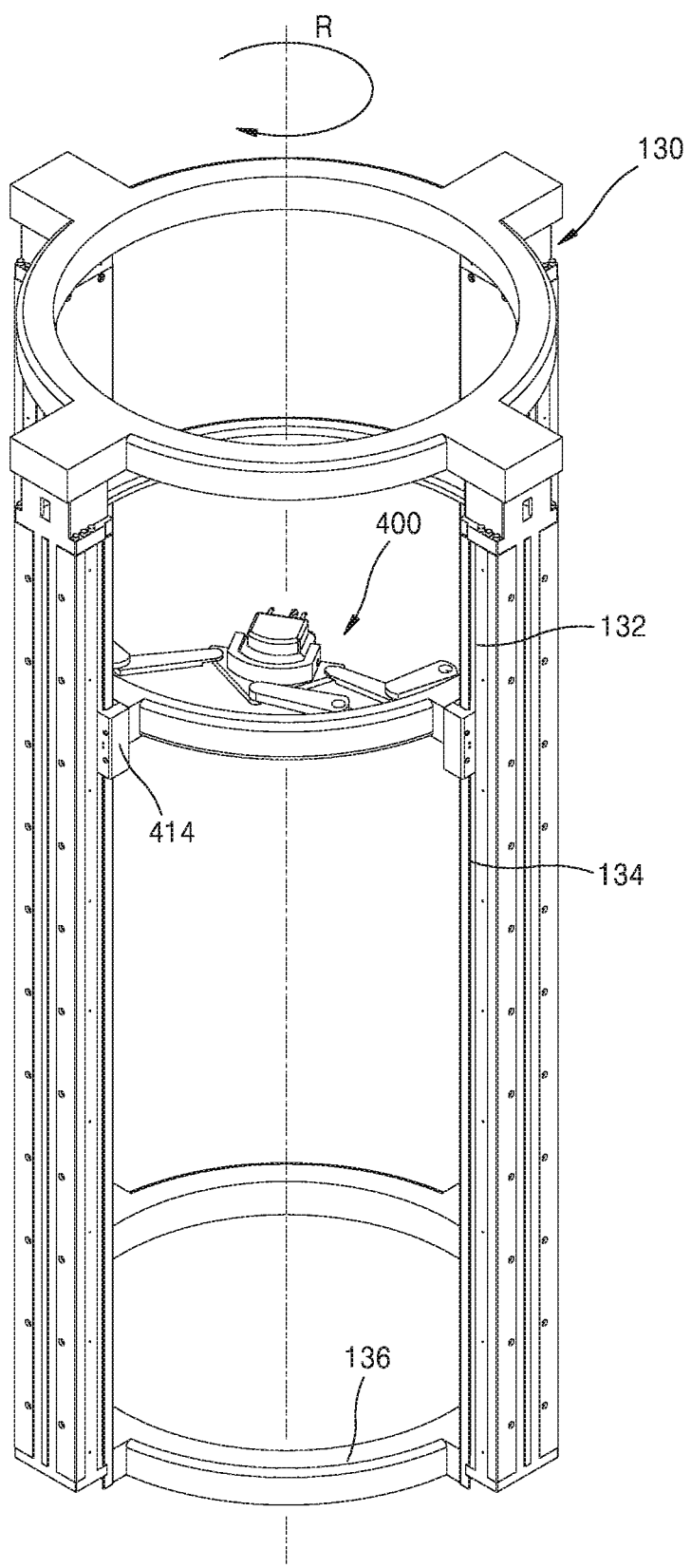

FIG. 6 illustrates the rotatable frame 130. The rotatable frame 130 includes the rotatable guide beams 132 arranged inside the circle formed by the outer guide beams 122. The rotatable guide beams 132 extend vertically and may be rotatable around the center of the circle formed by the outer guide beams 122. In a non-limiting example, a plurality of rotatable frames 130 may be arranged concentrically with the circle formed by the outer guide beams 122.

Sub guide rails 134 may extend vertically on inner sides of the rotatable guide beams 132. The function of the main guide rails 134 is similar to the above-described function of the main guide rails 112. That is, second main guide parts 414 of the cutting unit 400 are connected to the sub guide rails 134 to enable vertical movement of the cutting unit 400.

In more detail, the rotatable frame 130 may include a ring-shaped connection part 136 which is connected to lower portions of the rotatable guide beams 132 and concentric with the circle formed by the outer guide beams 122. That is, the rotatable frame 130 may have a shape shown in FIGS. 5 to 7. The lower portions of the rotatable guide beams 132 may be connected to the ring-shaped connection part 136.

In addition, the outer frame 120 may include a cylindrical connection part 124 connecting lower portions of the outer guide beams 122 and inserted into the ring-shaped connection part 136. The cylindrical connection part 124 may have an outer diameter corresponding to the inner diameter of the ring-shaped connection part 136. Instead of directly connecting the outer guide beams 122 to the cylindrical connection part 124, the lower portions of the outer guide beams 122 may be connected to a jig having a predetermined area, and the cylindrical connection part 124 may be formed on an upper portion of the jig.

The rotatable frame 130 may be rotated by rotating the ring-shaped connection part 136 on the cylindrical connection part 124. In this case, a driving unit such as a motor may be used to rotate the rotatable frame 130.

The stacking base unit 200 may be disposed above the cylindrical connection part 124, and a height adjusting device 202 may be placed on a lower portion of the stacking base unit 200 to adjust the vertical position of the stacking base unit 200. For example, the vertical length of the height adjusting device 202 may be varied to vertically move the stacking base unit 200. This structure will be described in detail when the stacking base unit 200 is described later in detail.

The cutting unit 400 is connected to the inner side of the rotatable frame 130. In detail, the cutting unit 400 is connected to the rotatable guide beams 132 and vertically movable along the rotatable guide beams 132. In addition, the cutting unit 400 may be moved on a plane when the rotatable frame 130 is rotated. Therefore, the cutting unit 400 may cut or grind a proper area of an object.

The stacking base unit 200 will now be described in detail with reference to FIGS. 8 to 24.

The stacking base unit 200 may include: a first jig 210 having a predetermined area; and a bed 220 disposed on top of the first jig 210 to receive a raw material extruded from the extrusion unit 300. A plurality of support holes 222 are formed in the bed 220.

Figure 8:
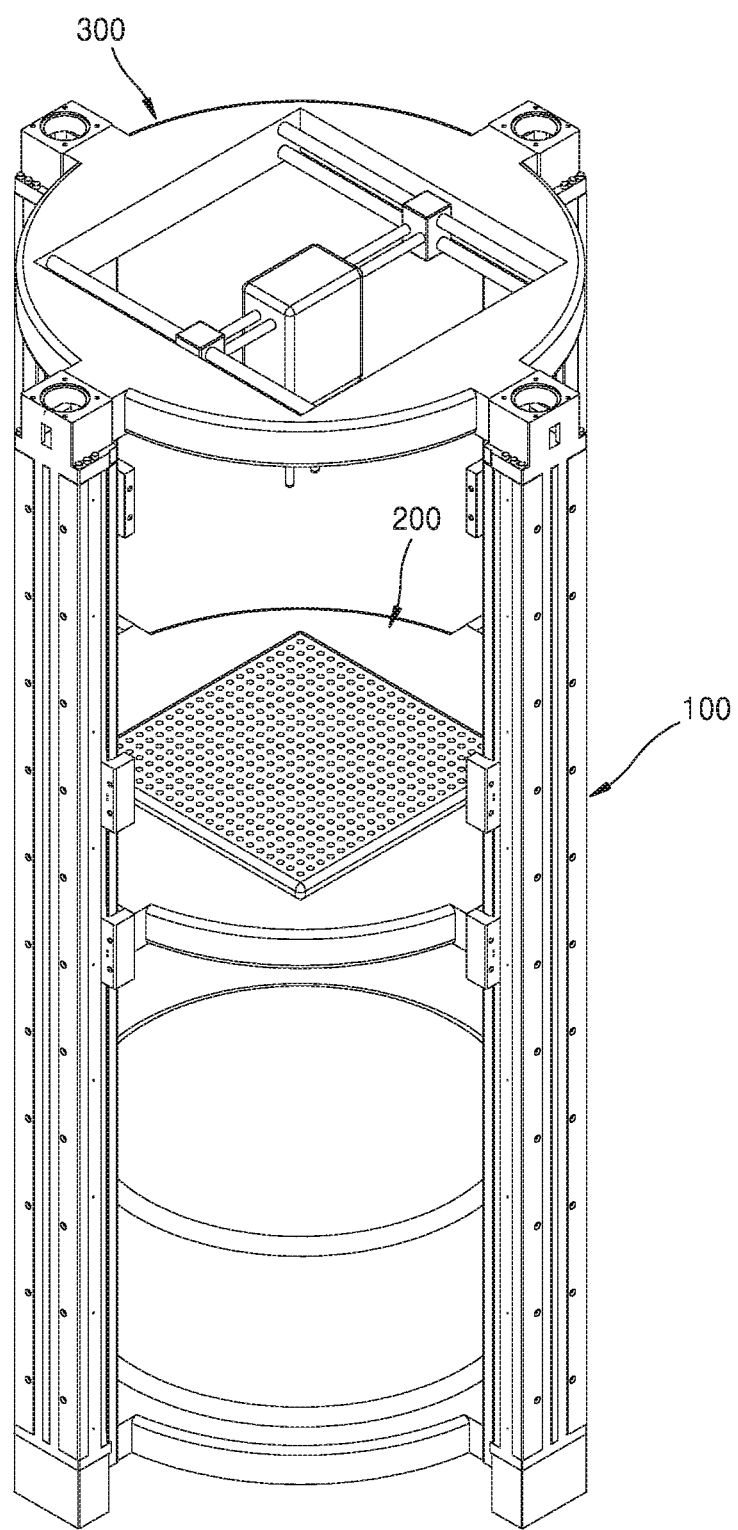
FIGS. 8 and 13 illustrate a stacking base unit of the 3D printer having a dual stage structure according to an exemplary embodiment.
Figure 9:
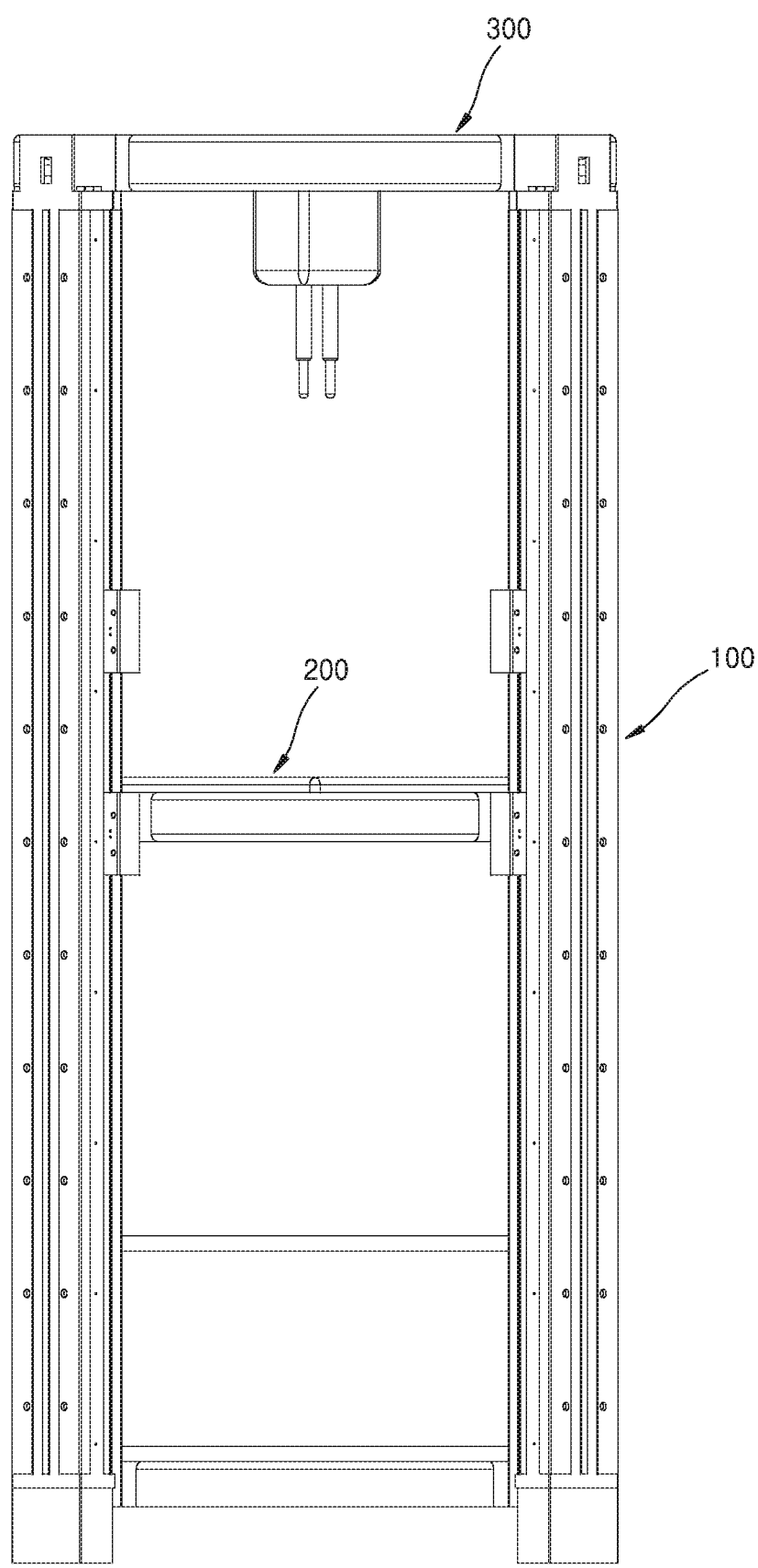
Figure 10:
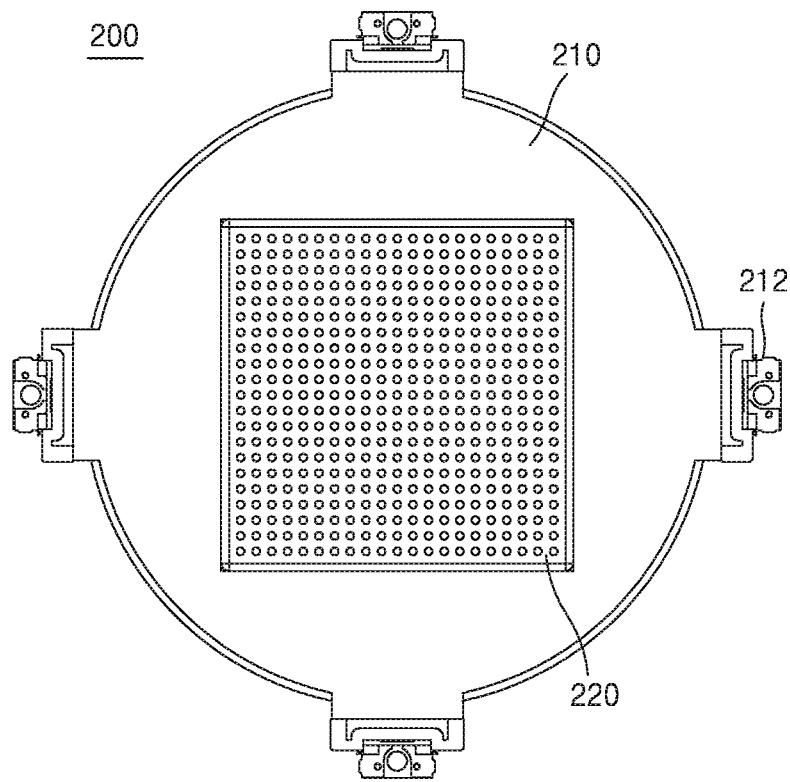
Figure 11:
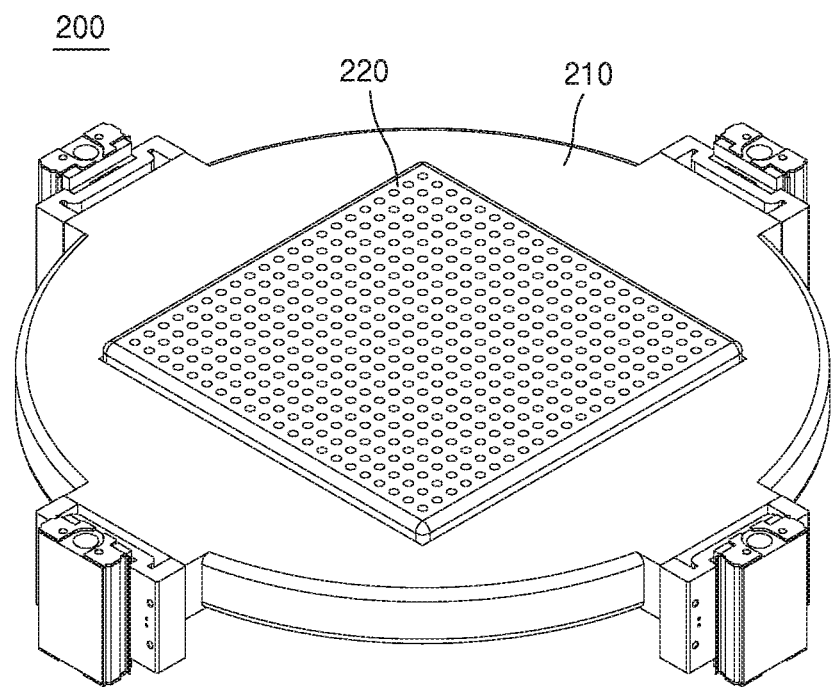
Figure 12:
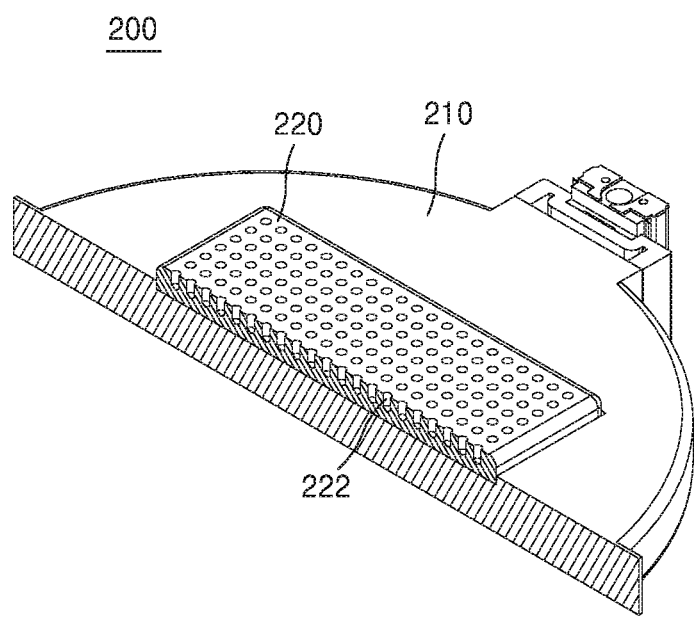
Figure 13:
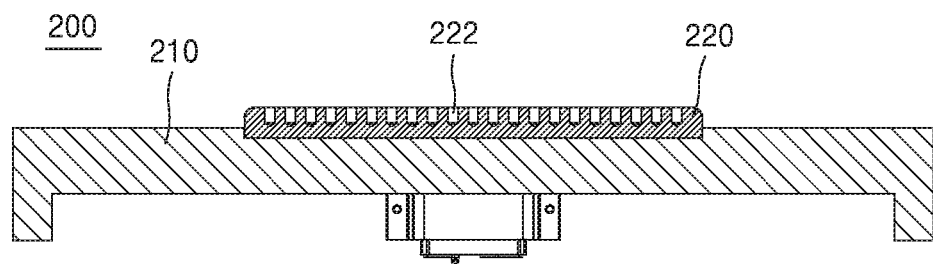

FIGS. 8 and 9 illustrate the stacking base unit 200 connected to the frame 100. The first jig 210 of the stacking base unit 200 has a plate shape and a predetermined area. According to an exemplary embodiment, first main guide parts 212 may be disposed on lateral portions of the first jig 210 and connected to the frame 100.

The bed 220 is disposed on the first jig 210 to receive a raw material extruded from the extrusion unit 300. The bed 220 has a structure and area adapted to form an object layer-by-layer by receiving a raw material thereon. The support holes 222 are formed in the bed 220. The support holes 222 have a diameter and depth that allow the raw material to be sufficiently received therein.

Since the support holes 222 are formed in the bed 220, when an object is formed from the raw material, the object may be securely fixed on the bed 220. That is, the raw material extruded toward the bed 220 is first filled in the support holes 222 and continuously formed into an object. Thus, the object is supported in a state where lower portions of the object are inserted in the support holes 222. Therefore, the object may be supported without the help of an additional complex structure or device, and even though a force is applied to the object when the cutting unit 400 cuts the object, the object may be securely fixed in place.

The first jig 210 is vertically movable.

According to an exemplary embodiment, as shown in FIGS. 8 to 13, the first main guide parts 212 are disposed on the lateral portions of the first jig 210 and connected to the main guide rails 134 of the frame 100 so that the first jig 210 and the stacking base unit 200 may be vertically moved along the main guide rails 134.

In another exemplary embodiment, as shown in FIGS. 14 to 20, the first jig 210 may be vertically moved by the height adjusting device 202 disposed on a lower portion of the first jig 210.

Figure 14:
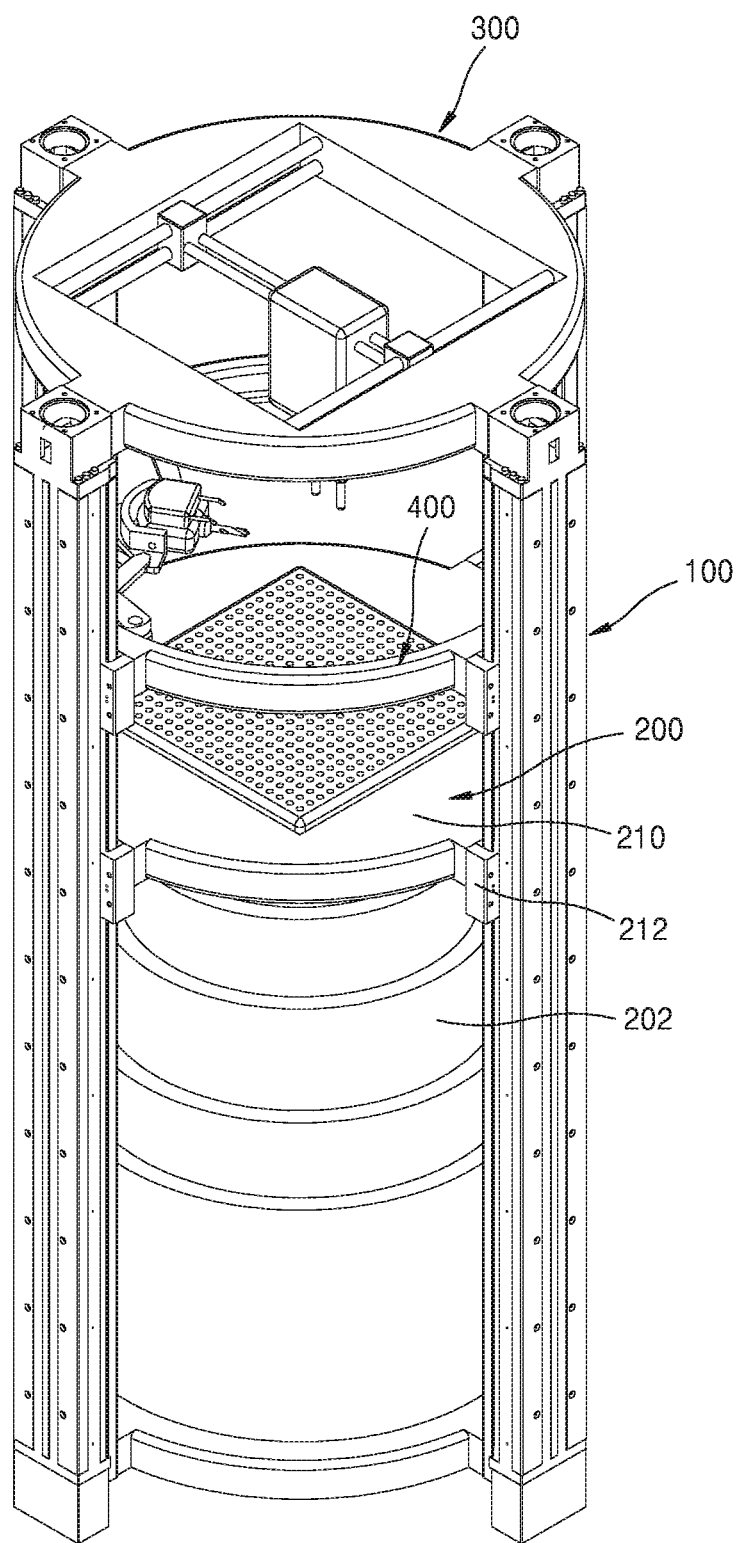
FIGS. 14 and 16 illustrate the stacking base unit of the 3D printer having a dual stage structure according to another exemplary embodiment.
Figure 15:
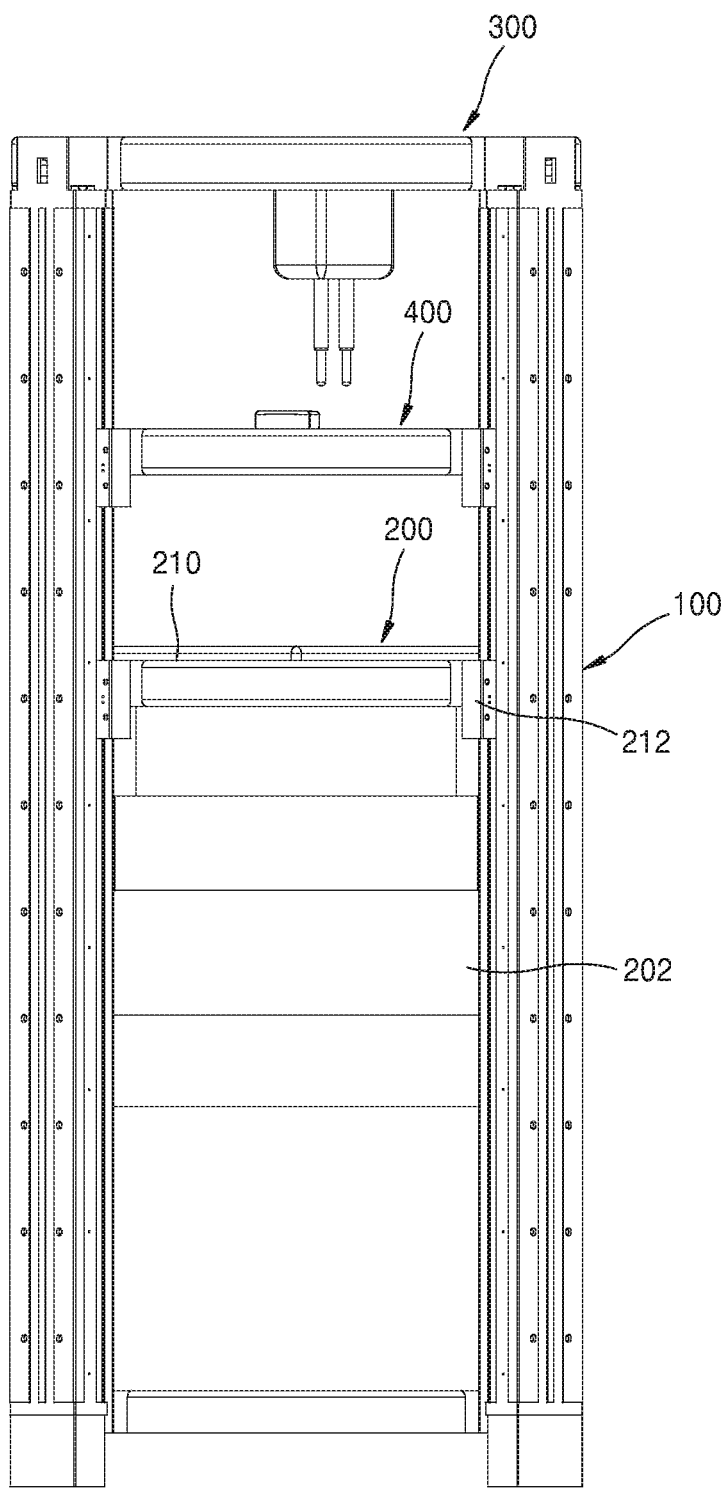
Figure 16:
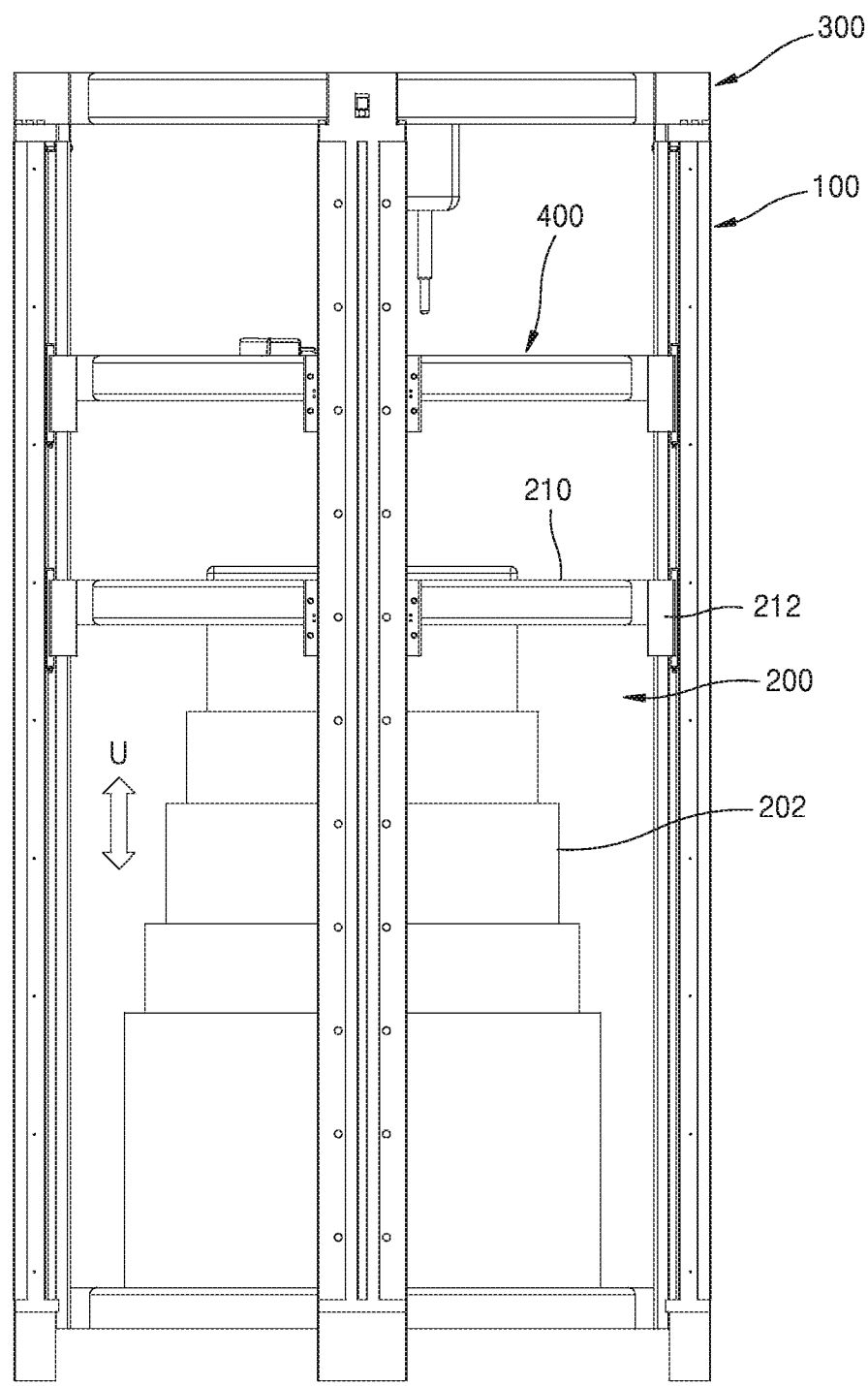
Figure 17:
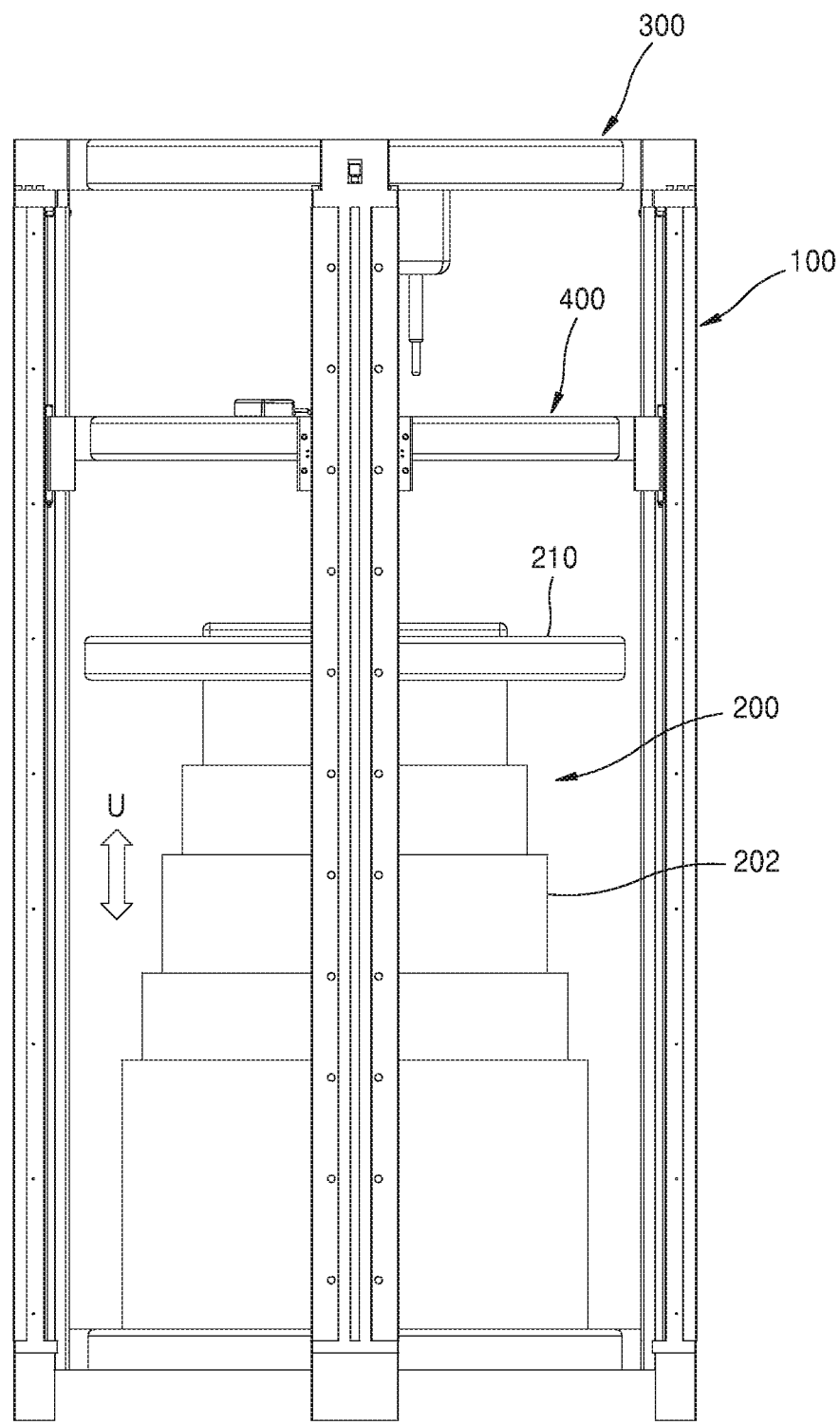
FIGS. 17 to 20 illustrate the stacking base unit of the 3D printer having a dual stage structure according to another exemplary embodiment.
Figure 18:
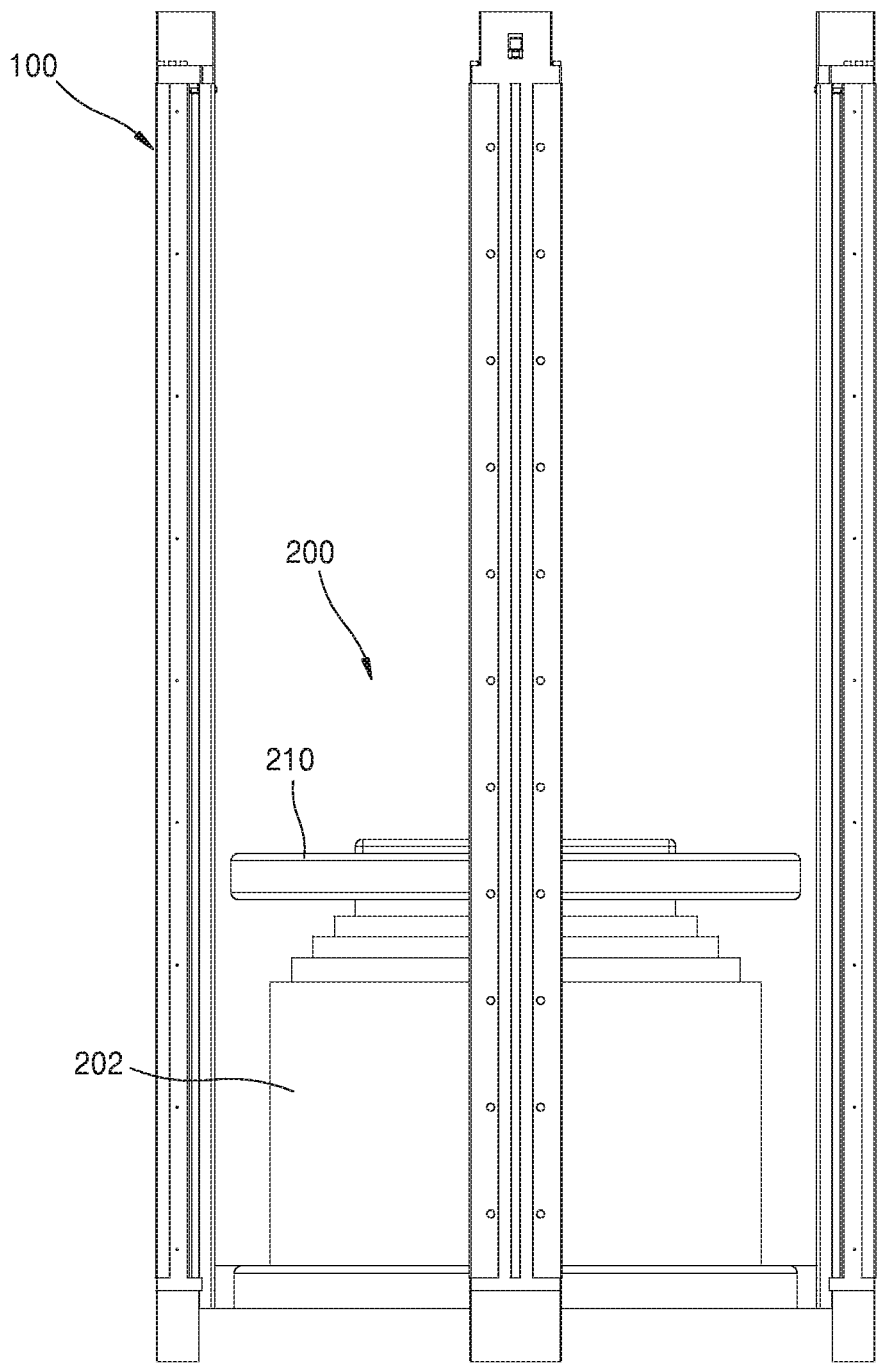
Figure 19:
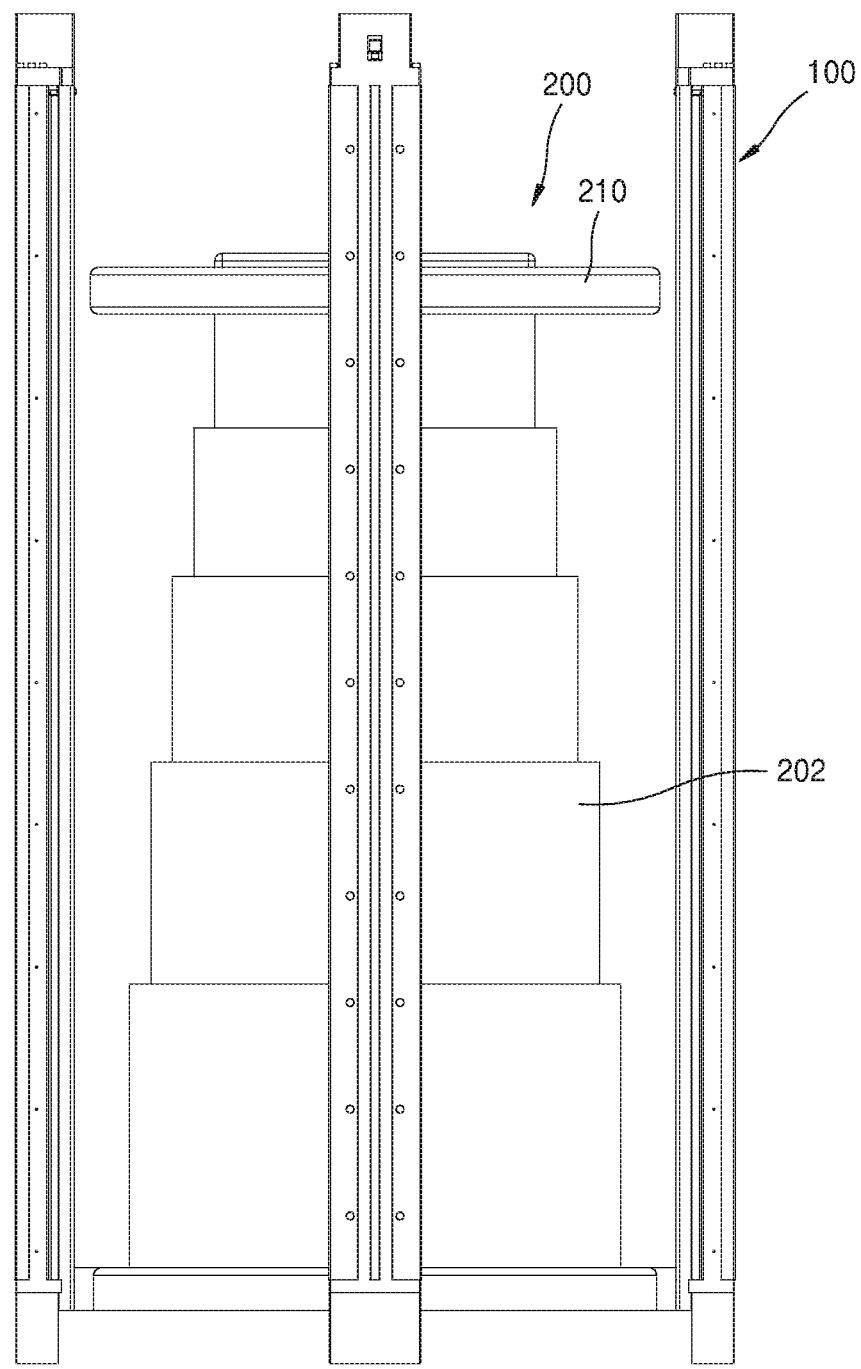

In this case, the first jig 210 may be vertically moved as indicated by an arrow U by adjusting the length of the height adjusting device 202. According to an exemplary embodiment, as shown in FIGS. 14 to 16, the first main guide parts 212 may be disposed on the lateral portions of the first jig 210 and connected to the main guide rails 134.

Figure 20:
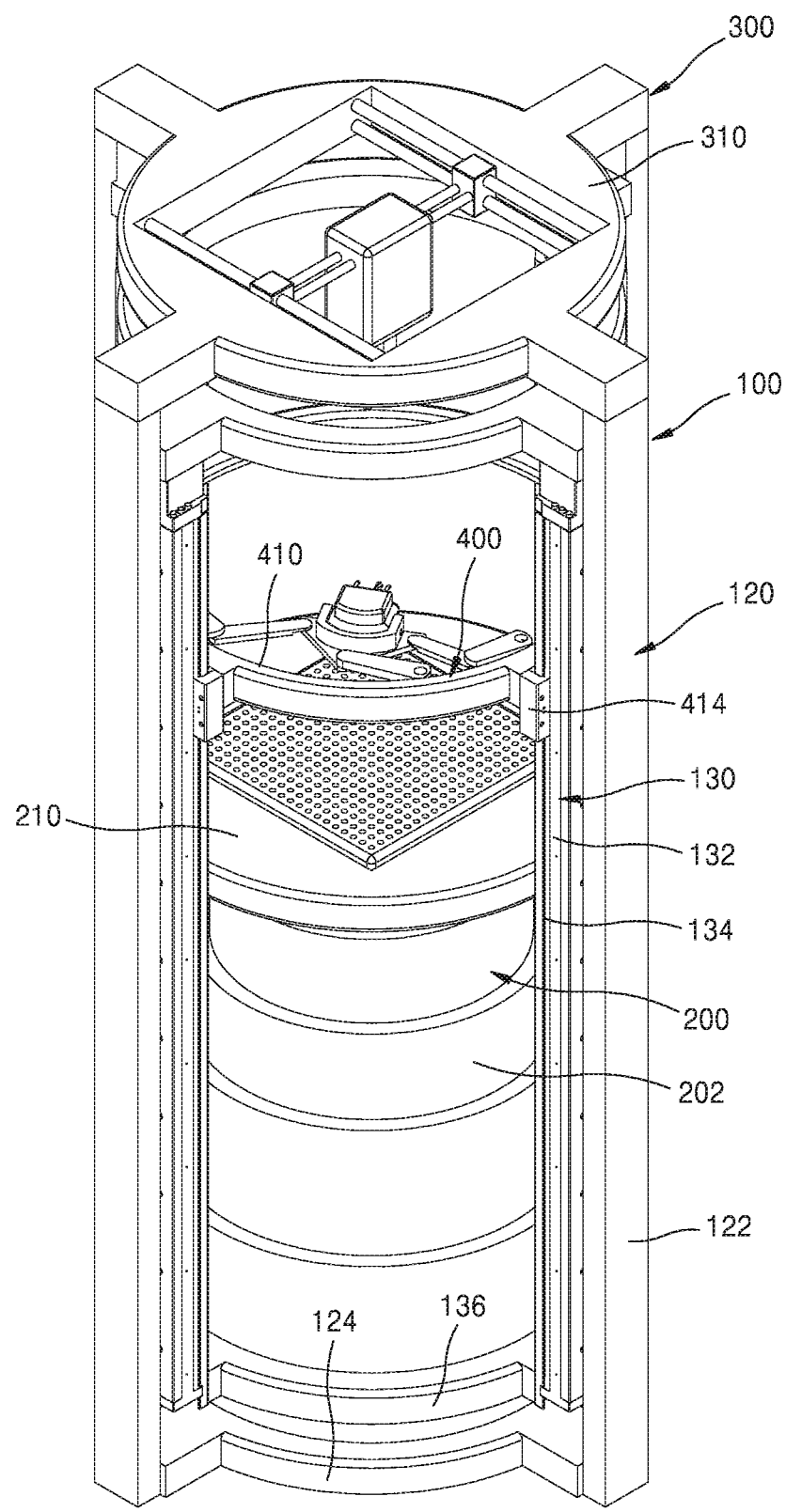

According to another exemplary embodiment, as shown in FIGS. 17 to 20, the first main guide parts 212 may not be provided on the lateral portions of the first jig 210, and the lateral portions of the first jig 210 may not be connected to the main guide rails 134. Even in this case, the first jig 210 may be vertically moved as indicated by the arrow U by adjusting the length of the height adjusting device 202. These structures of the exemplary embodiments may be applied to the exemplary embodiment described with reference to FIGS. 5 to 7. That is, as shown in FIG. 20, the outer frame 120 and the rotatable frame 130 may be connected to each other through the cylindrical connection part 124 and the ring-shaped connection part 136. In this case, the height adjusting device 202 may be disposed on the cylindrical connection part 124. That is, since lateral portions of the stacking base unit 200 are not connected to the frame 100, the rotatable frame 130 to which the cutting unit 400 is connected may be independently rotated.

A lower portion of the height adjusting device 202 may be connected to the frame 100, and an upper portion of the height adjusting device 202 may be connected to a lower surface of the first jig 210. The first jig 210 and the bed 220 may move vertically as a vertical length of the height adjusting device 202 is varied. That is, since the height adjusting device 202 having a tower structure is disposed on the lower portion of the first jig 210, the height of the first jig 210 may be varied by adjusting the height of the height adjusting device 202.

FIGS. 21 to 24 are views schematically illustrating the bed 220 of the stacking base unit 200 of the 3D printer 1 having a dual stage structure according to an exemplary embodiment.

The bed 220 may include first to third build plates 230, 240, and 250 having predetermined areas and being sequentially stacked, and the first to third build plates 230, 240, and 250 may include first to third support holes 234, 244, and 254, respectively. The first to third build plates 230, 240, and 250 may be horizontally moved to align or misalign the first and second to third support holes 234, 244, and 254 with each other in a vertical direction.

Referring to FIGS. 21 to 24, the bed 220 may include a stack of the first to third build plates 230, 240, and 250 having predetermined areas. The first to third build plates 230, 240, and 250 may have predetermined areas and thicknesses, respectively, and may be stacked on each other. The first to third holes 234, 244, and 254 may be formed in the areas of the first to third build plates 230, 240, and 250, respectively, and the first to third support holes 234, 244, and 254 may be arranged in the same manner.

The first to third build plates 230, 240, and 250 may be horizontally moved relative to each other to align or misalign the first to third support holes 234, 244, and 254 with each other in the vertical direction. That is, the first to third support holes 234, 244, and 254 may be aligned with each other to form penetrations holes or may be misaligned with each other to block some of the first to third support holes 234, 244, and 254 in the vertical direction.

Figure 21:
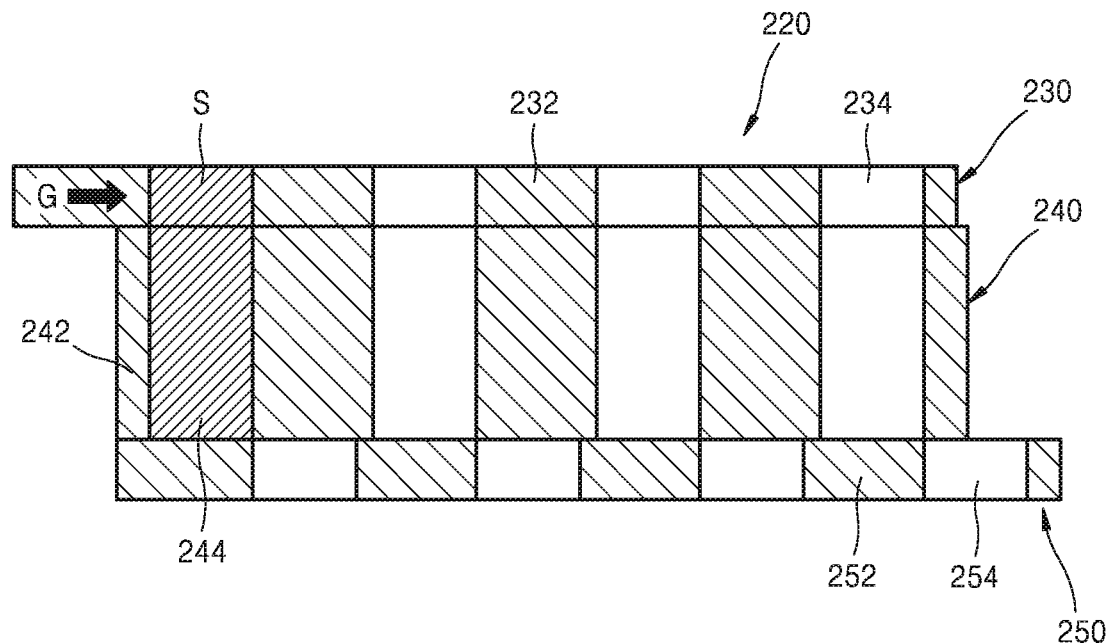
FIGS. 21 and 24 illustrate the stacking base unit of the 3D printer having a dual stage structure according to another exemplary embodiment.

First, referring to FIG. 21, when the raw material is extruded from the extrusion unit 300, the first and second support holes 234 and 244 of the first and second build plates 230 and 240 may be aligned with each other. Then, the raw material may be filled in the first and second support holes 234 and 244 and then may be arranged above the first and second support holes 234 and 244. As the raw material hardens in the first and second support holes 234 and 244, the raw material may be supported by the first and second support holes 234 and 244. At this time, the third support holes 254 are not aligned with the first and second support holes 234 and 244.

Figure 22:
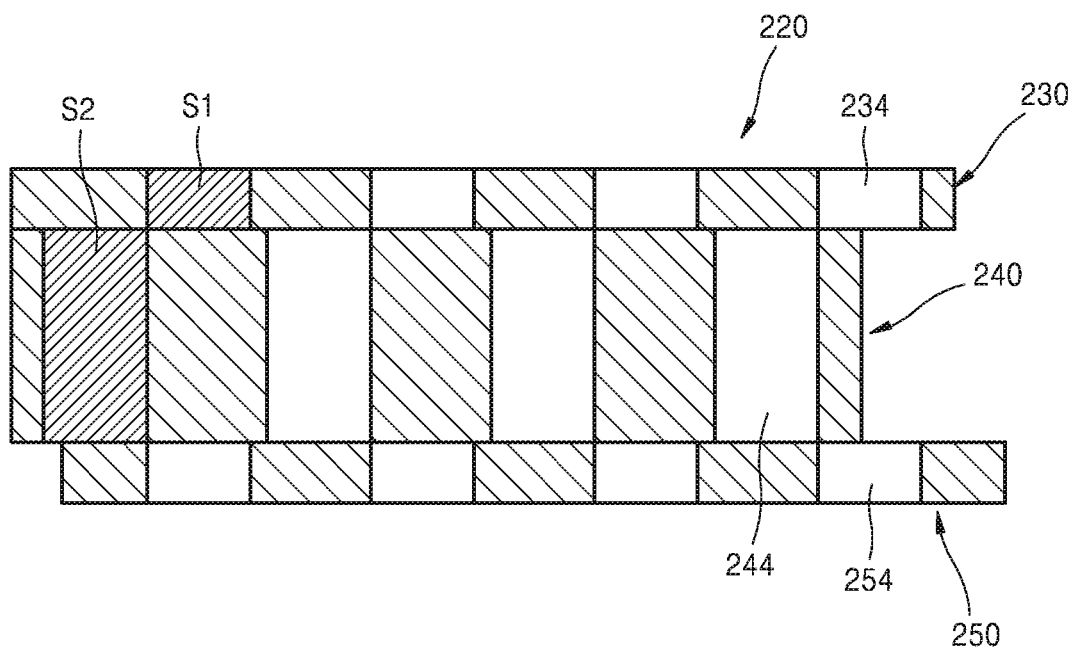

Next, if the first build plate 230 is moved in the direction of a first arrow G as shown in FIG. 22, the first and second support holes 234 and 244 are misaligned, and the raw material hardened in the first and second support holes 234 and 244 is cut. That is, as shown in FIG. 22, the raw material hardened in the first and second support holes 234 and 244 is cut into portions S1 in the first support holes 234 and portions S2 in the second support holes 244.

Figure 23:
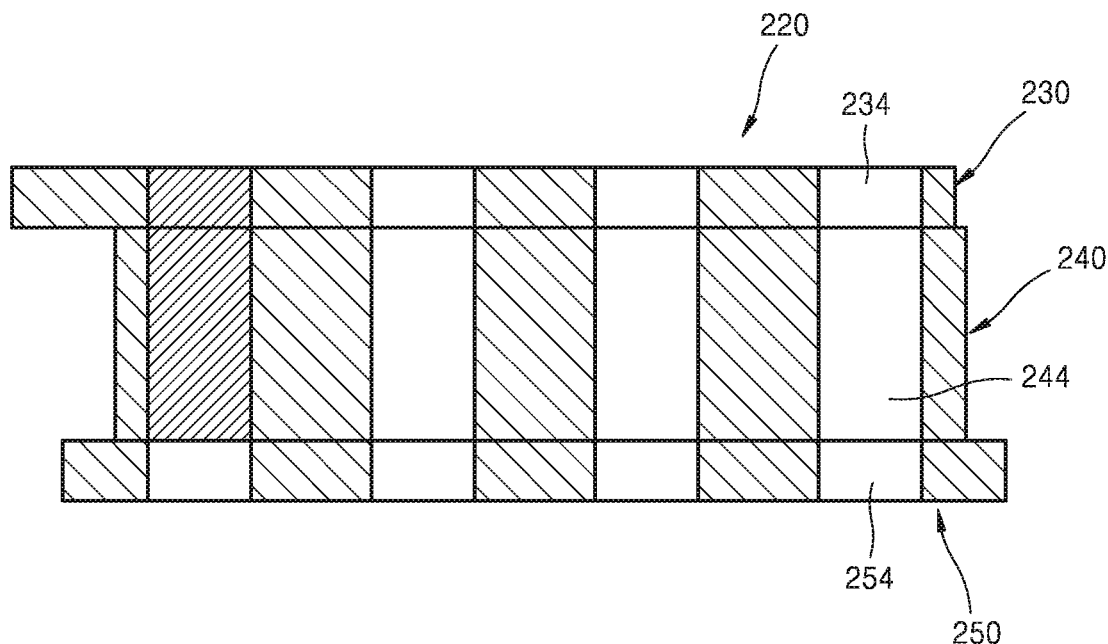
Figure 24:
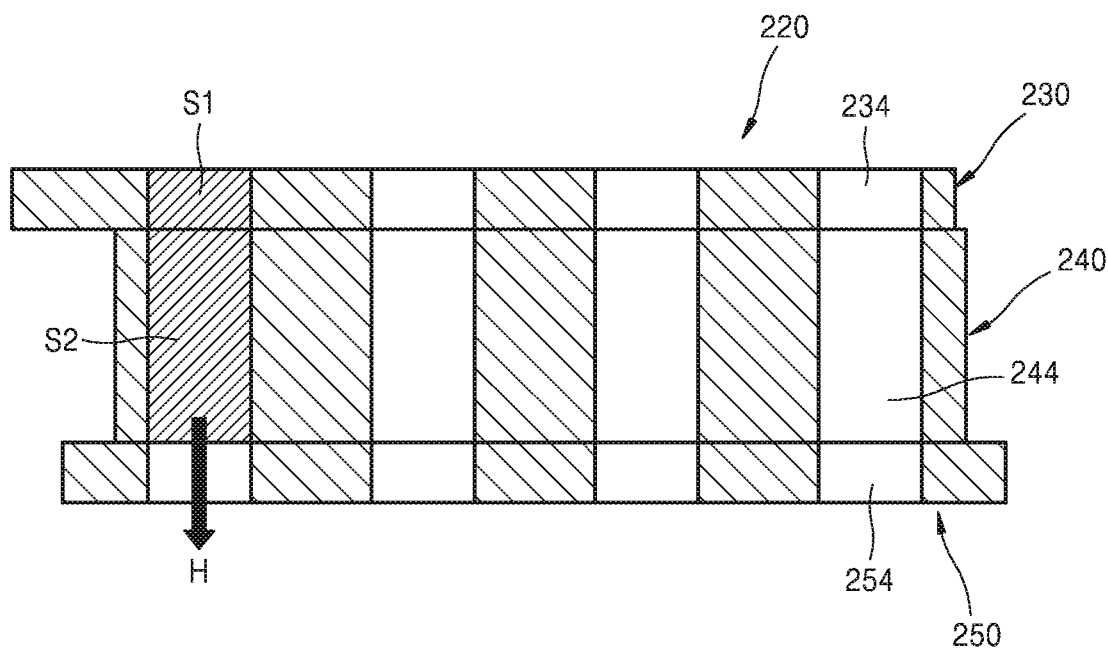

Next, if the second build plate 240 or the third build plate 250 is moved to align the second and third support holes 244 and 254 with each other as shown in FIG. 23, the portions S2 disposed in the second support holes 244 may fall through the third support holes 254 in the direction of an arrow H as shown in FIG. 24. Therefore, support portions may be easily removed from a formed object, and the object may be easily separated from the first to third support holes 234, 244, and 254.

Figure 25:
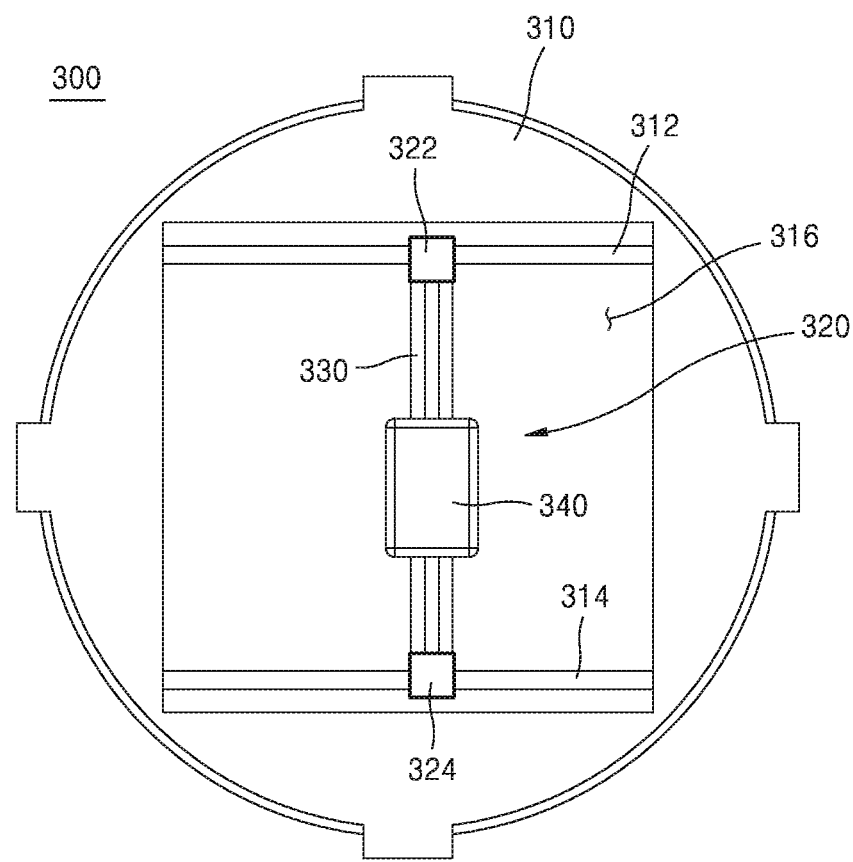
FIGS. 25 and 26 illustrate an extrusion unit of the 3D printer having a dual stage structure according to an exemplary embodiment.
Figure 26:
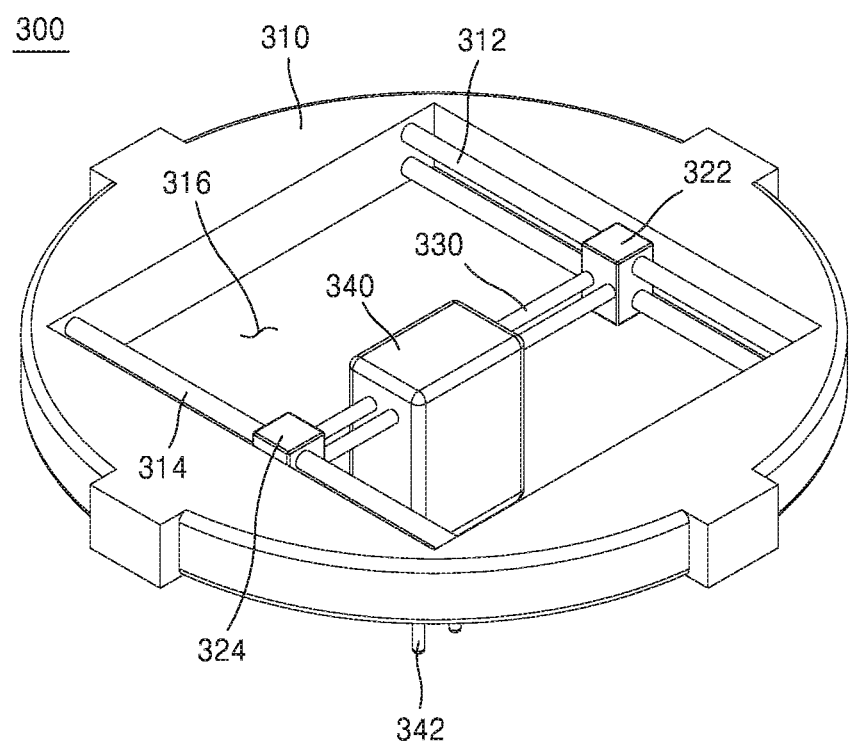

FIGS. 25 and 26 are views illustrating the extrusion unit 300 of the 3D printer 1 having a dual stage structure according to an exemplary embodiment. The extrusion unit 300 will now be described in more detail with reference to FIGS. 25 and 26.

According to the exemplary embodiment, the extrusion unit 300 includes: a second jig 310 connected to the frame 100 and including an empty space 316 in the second jig 310; and an extrusion device 320 disposed in the space 316. The second jig 310 includes first guide beams 312 and 314 disposed in the space 316 and extending in at least one direction. The extrusion device 320 includes: second guide beams 330 connected to the first guide beams 312 and 314 and extending in a direction perpendicular to the first guide beams 312 and 314, the second guide beams 330 being movable along the first guide beams 312 and 314 in the direction in which the first guide beams 312 and 314 extend; and the nozzle 340 connected to the second guide beams 330 and movable along the second guide beams 330 in the direction in which the second guide beams 330 extend.

The second jig 310 is connected to the frame 100. For example, the second jig 310 may be fixed to an upper end of the frame 100 as described above with reference to FIGS. 1 and 2. In another example, as shown in FIG. 3, the second jig 310 may include third main guide parts 302 connected to the main guide rails 112, and the thus the second jig 310 may be vertically movable along the connection terminal 1120.

The space 316 formed inside the second jig 310 has a predetermined area, and the extrusion device 320, including the nozzle 340, is disposed in the space 316 and extrudes the raw material through the nozzle 340. The extrusion device 320 is movable in the space 316.

The first guide beams 312 and 314 are disposed inside the space 316. The first guide beams 312 and 314 may extend in one direction across the space 316. The number of first guide beams 312 and 314 may be one or more. For example, as shown in FIGS. 25 and 26, one or more first guide beams 312 and 314 may extend in parallel with each other in each lateral region of the space 316.

The extrusion device 320 includes the second guide beams 330 and the nozzle 340. The second guide beams 330 are connected to the first guide beams 312 and 314 and extend in a direction perpendicular to the first guide beams 312 and 314. The second guide beams 330 are movable along the first guide beams 312 and 314 in the direction in which the first guide beams 312 and 314 extend. In this case, connection parts 322 and 324 may be used to connect the second guide beams 330 to the first guide beams 312 and 314 in a movable manner.

The nozzle 340 is connected to the second guide beams 330 and movable along the second guide beams 330 in the direction in which the second guide beams 330 extend. The nozzle 340 may extrude the raw material through extrusion holes 342.

Owing to the above-described structure, the nozzle 340 and the second guide beams 330 are movable in the direction in which the first guide beams 312 and 314 extend, and the nozzle 340 is also movable in the direction in which the second guide beams 330 extend. That is, the nozzle 340 is movable to any position on a plane, and thus, the raw material may be extruded at a desired position through the nozzle 340.

The cutting unit 400 will now be described in detail.

Figure 27:
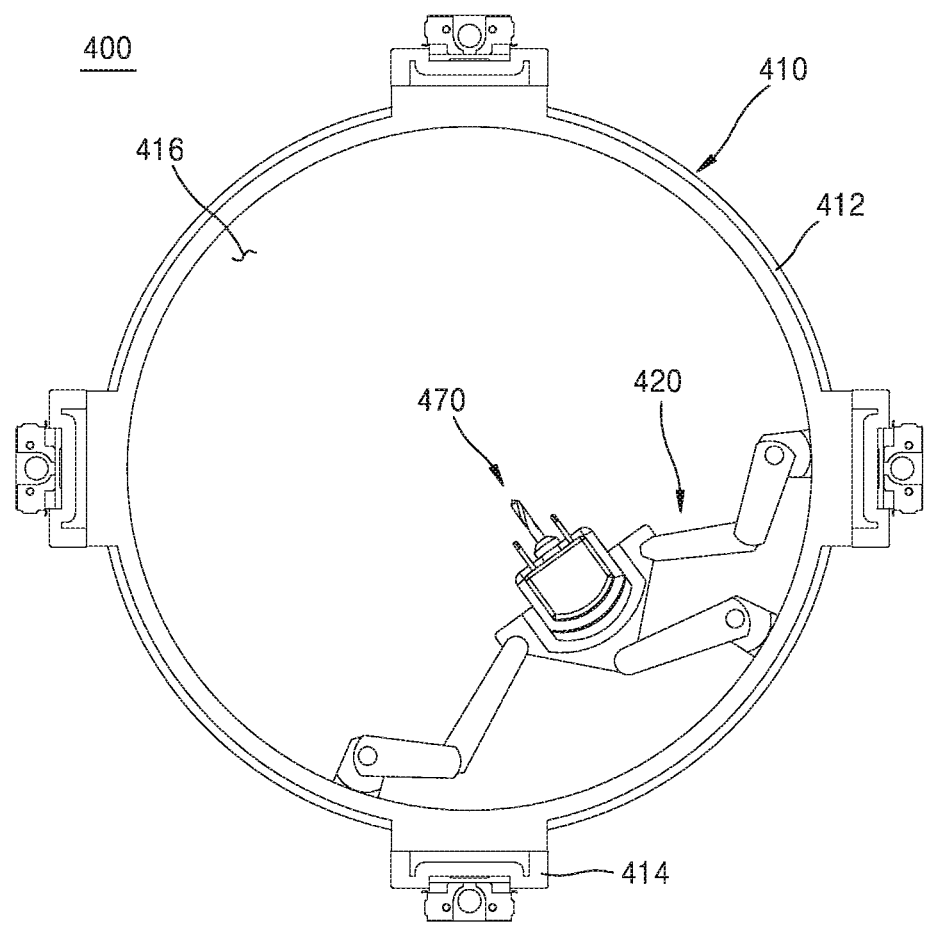
FIGS. 27 to 32 illustrate a cutting unit of the 3D printer having a dual stage structure according to an exemplary embodiment.
Figure 28:
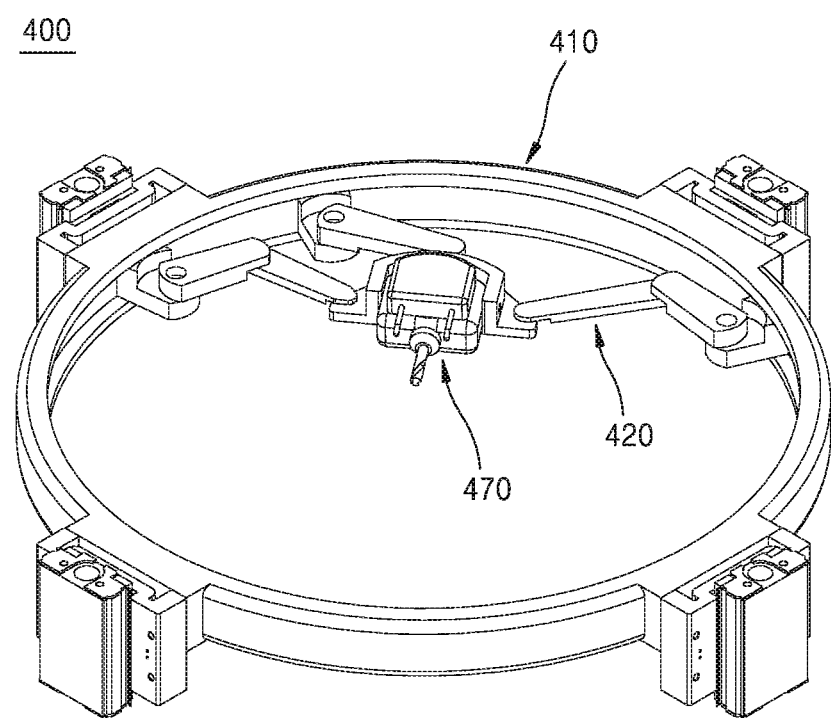
Figure 29:
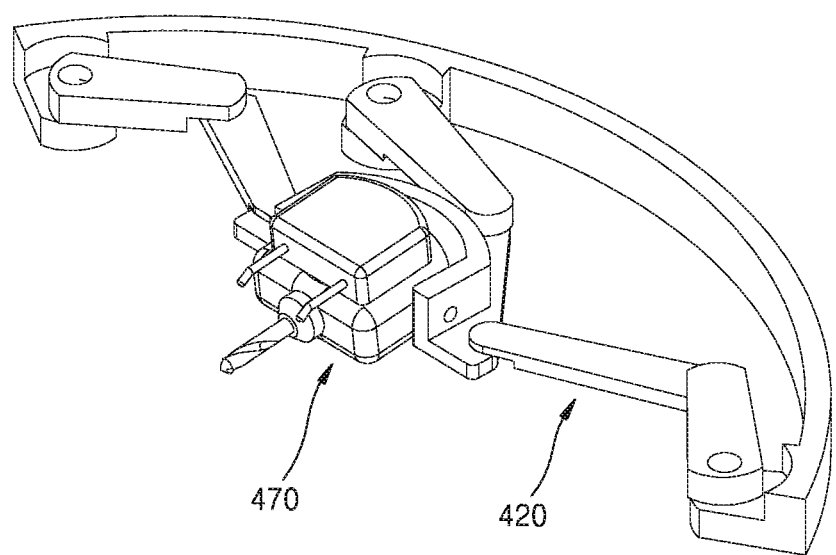
Figure 30:
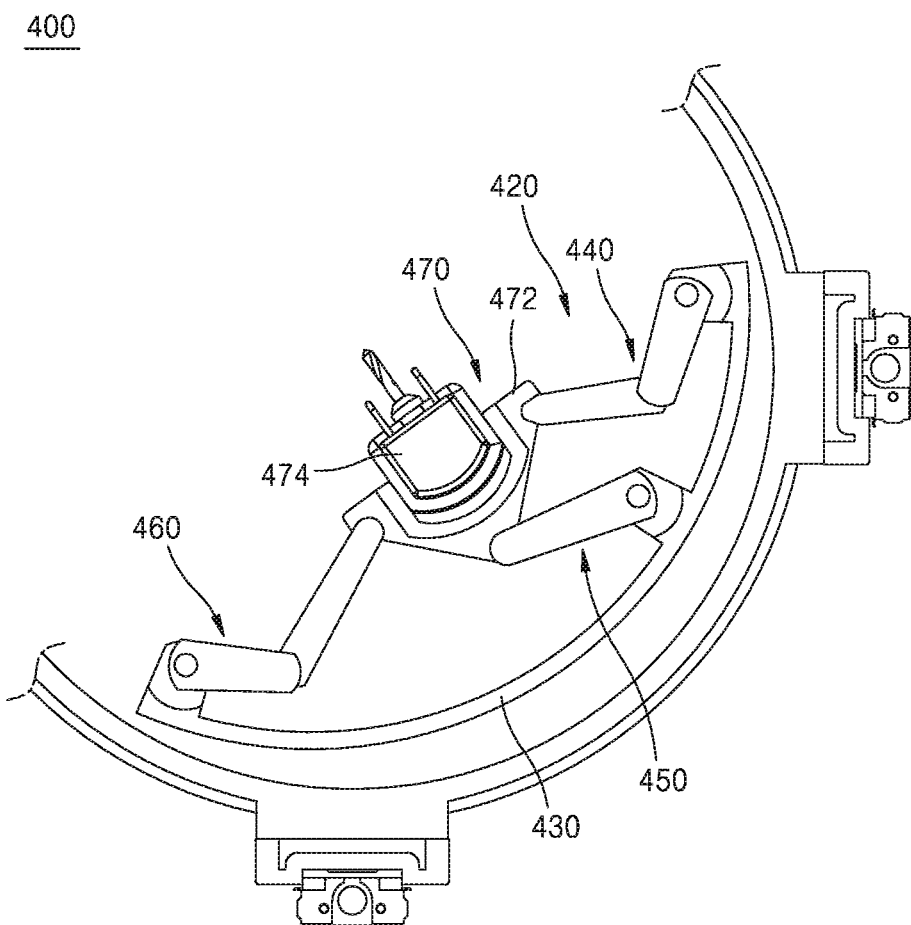
Figure 32:
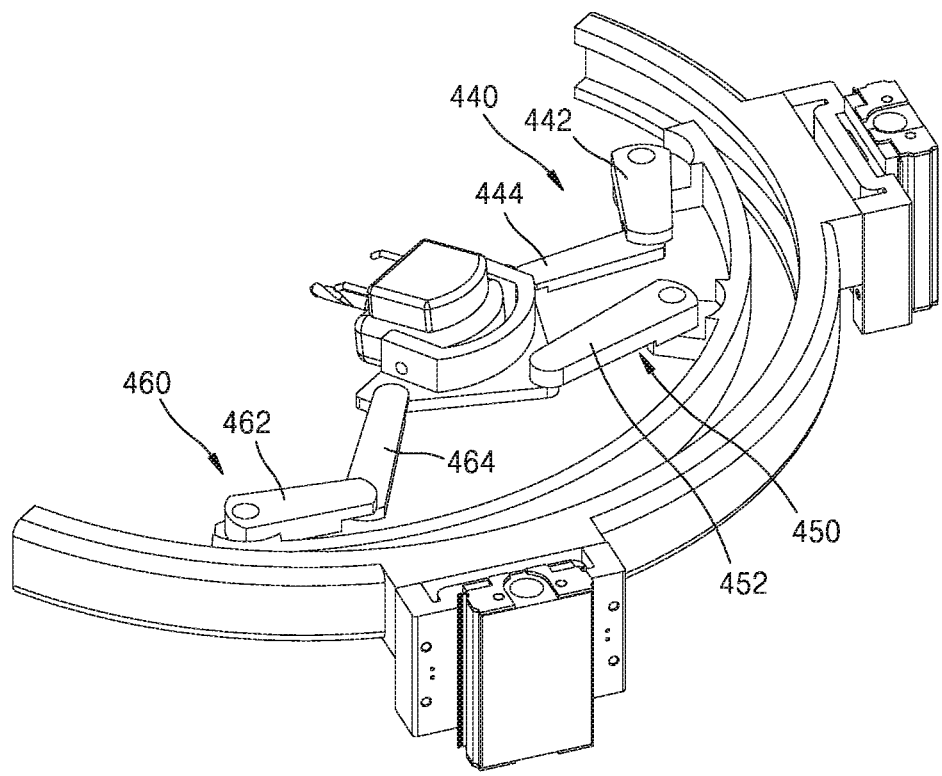

FIGS. 27 and 32 are views illustrating the cutting unit 400 of the 3D printer 1 having a dual stage structure according to an exemplary embodiment.

According to the exemplary embodiment, the cutting unit 400 includes: a third jig 410 including second main guide parts 414 disposed on outer sides of the third jig 410 and connected to the main guide rails 112 to move vertically along the main guide rails 112, an empty space 416 formed in the third jig 410; a cutting device 470 disposed in the space 416; and a connection unit 420 connecting the third jig 410 and the cutting device 470 together. The connection unit 420 includes one or more variable legs for moving the cutting device 470 in the empty space 416.

The third jig 410 includes the second main guide parts 414 disposed on the outer sides of the third jig 410. The second main guide parts 414 are connected to the main guide rails 112 for guiding a vertical movement of the third jig 410. The space 416 formed inside the third jig 410 has a predetermined area, and the cutting device 470 and the connection unit 420 are disposed in the space 416.

Therefore, as shown in FIG. 27, the third jig 410 may have a circular ring shape. However, the third jig 410 is not limited thereto. For example, the third jig 410 may have other shapes such as an elliptical or polygonal shape.

The cutting device 470 and the connection unit 420 are disposed in the space 416. The cutting device 470 is used to cut or grind a formed object, and the connection unit 420 connects the cutting device 470 and the third jig 410.

The connection unit 420 includes one or more legs connecting the cutting device 470 to the third jig 410.

The third jig 410 may include an inner guide rail 412. The inner guide rail 412 may have a groove shape extending along the inner circumference of the third jig 410. It is sufficient that the inner guide rail 412 guides movement of an inner guide part 430 (to be described later).

The connection unit 420 further includes the inner guide part 430 connected to the inner guide rail 412 and movable along the inner guide rail 412. The legs are connected to the inner guide part 430, and the cutting device 470 may be moved in the empty space 416 according to the movement of the inner guide part 430.

That is, as described above, the inner guide part 430 is connected to the inner guide rail 412 and movable in the empty space 416 along the inner guide rail 412. For example, the inner guide part 430 may be connected to the inner guide rail 412 and rotatable along the inner guide rail 412. That is, the inner guide part 430 is rotatable along the inner circumference of the third jig 410. Ends of the legs are connected to the inner guide part 430, and the other ends of the legs are connected to the cutting device 470. Therefore, the cutting device 470 is movable while rotating inside the space 416. For example, the movement of the cutting device 470 may be limited according to the shape of the third jig 410 and the number of legs of the connection unit 420.

As shown in FIGS. 29 to 32, the inner guide part 430 may be configured to move along the inner guide rail 412. For example, the third jig 410 may have a circular ring shape with a predetermined radius of curvature, and the empty space 416 may have a circular shape. In this case, the inner guide rail 412 formed along the inner circumference of the third jig 410 having a circular ring shape may have a predetermined radius of curvature. Therefore, the inner guide part 430 may have a radius of curvature the same as that of the inner guide rail 412 so that the inner guide part 430 may be moved along the inner guide rail 412. For example, the inner guide part 430 may have a circular shape or partially circular shape with an additional curved portion or a shape-variable structure. However, the inner guide part 430 is not limited thereto.

Each of the legs includes one or more links having predetermined lengths and connected to the inner guide part 430 and the cutting device 470. Ends of each of the links are connected to each other, and the links are rotatable on a plane within the empty space 416 to allow movement of the cutting device 470 on the plane.

That is, as shown in FIGS. 27 to 32, each of the legs includes one or more links having predetermined lengths and connected in a rotatable manner on a plane so as to allow rotation or movement of the cutting device 470 on the plane. For example, a leg including one or more rotatable links may be used to allow movement of the cutting device 470 on a plane. In another example, a plurality of legs, each including one or more links, may be operated in an interrelated manner so as to vary the position of the cutting device 470.

The cutting device 470 may be moved by a rotational movement of the links, and the inner guide part 430 may be moved along the inner guide rail 412. Therefore, when the cutting unit 400 performs a cutting operation, the cutting unit 400 is movable on a plane within a wide range.

For example, three or more legs may be provided, and ends of the legs may be connected to the cutting device 470 and the other ends of the legs may be connected to the inner guide part 430 to form a parallel connection structure.

That is, three or more legs may be connected in parallel between the inner guide part 430 and the cutting device 470 so as to improve the operational efficiency and precision of the cutting device 470.

Figure 31:
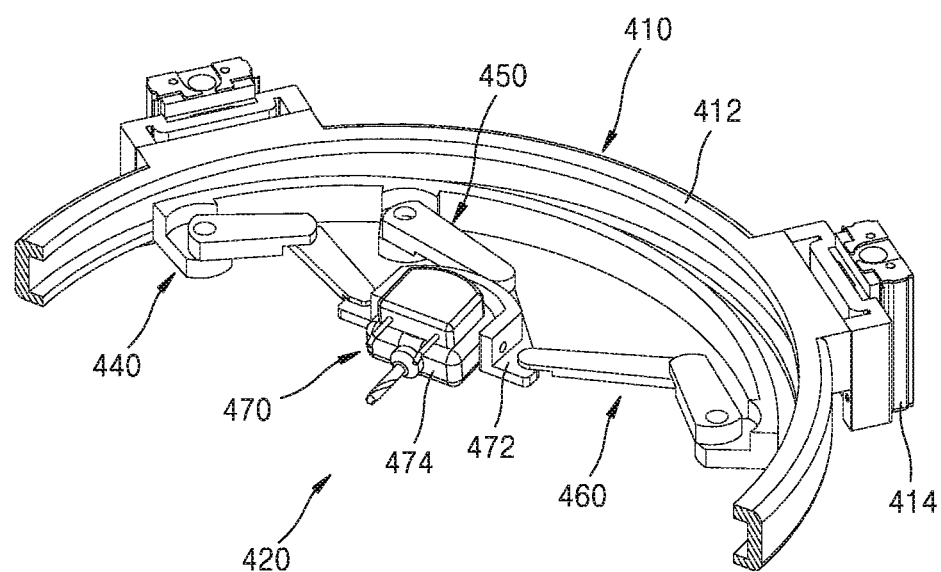

For example, as shown in FIGS. 31 and 32, the connection unit 420 may include a first leg 440, a second leg 450, and a third leg 460. The second leg 450 may be disposed between the first leg 440 and the third leg 460. The first leg 440 may include a first link 442 and a second link 444 that are rotatably connected to each other through a hinge. The second leg 450 may include a third link 452. The third leg 460 may include a fourth link 462 and a fifth link 464 that are rotatably connected to each other through a hinge.

In this case, driving devices may be respectively disposed at rotatably connected points of the links for rotating the links. If the links are rotated by the driving devices, the cutting device 470 may be accordingly moved. Whether to dispose the driving devices among the rotatably connected points of the links may be selected according to a movement of the cutting device 470.

The cutting device 470 includes a housing 472 connected to the legs and a cutting tool 474 connected to the housing 472. The cutting tool 474 is connected to the housing 472 in such a manner that the cutting tool 474 may rotate in upward and downward directions around an axis parallel with a plane on which the links are rotated.

Figure 33:
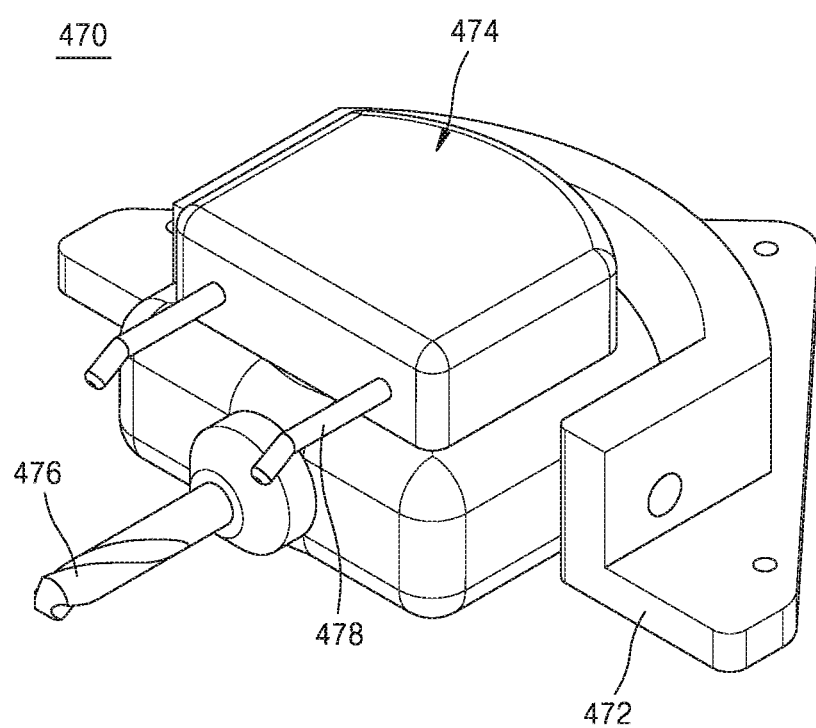
FIGS. 33 and 34 illustrate the cutting unit of the 3D printer having a dual stage structure according to another exemplary embodiment.
Figure 34:
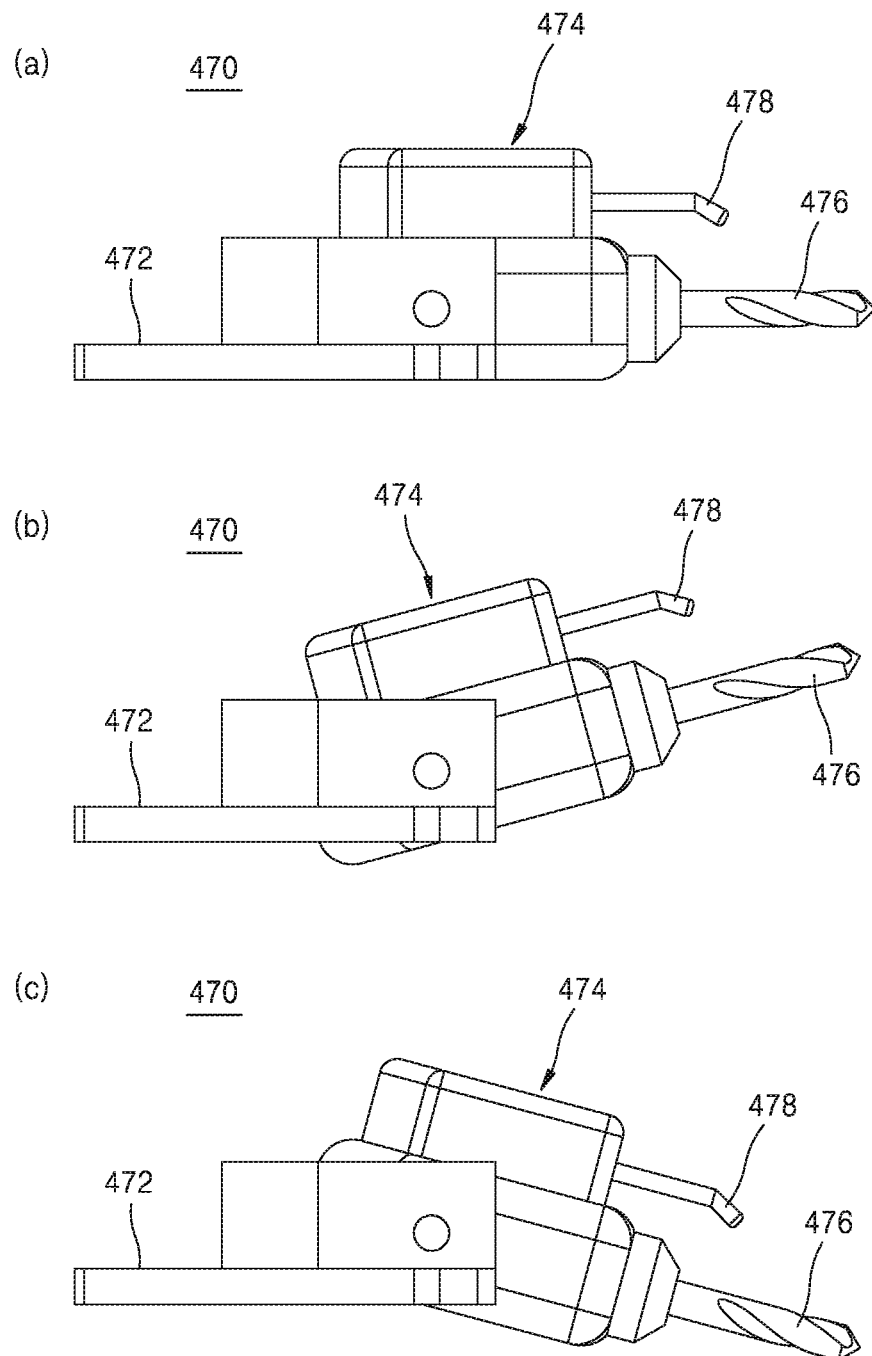
Figure 35:
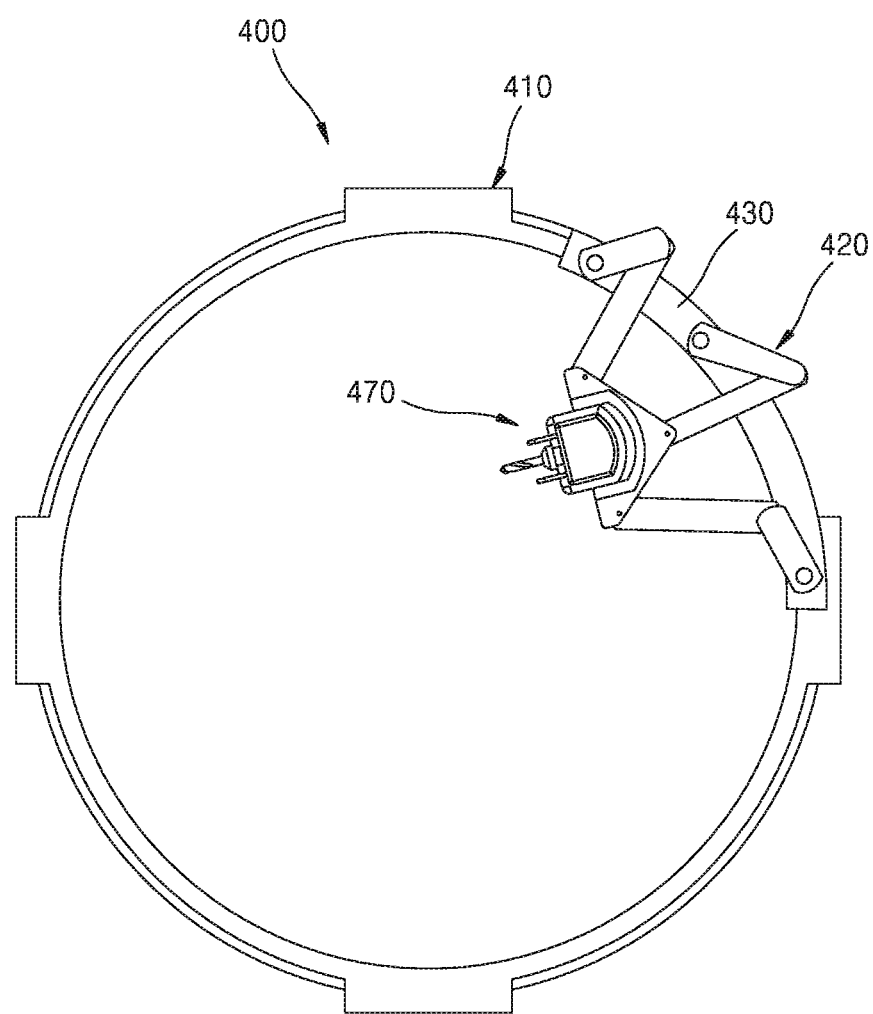
FIGS. 35 to 39 illustrate the cutting unit of the 3D printer having a dual stage structure according to another exemplary embodiment.
Figure 36:
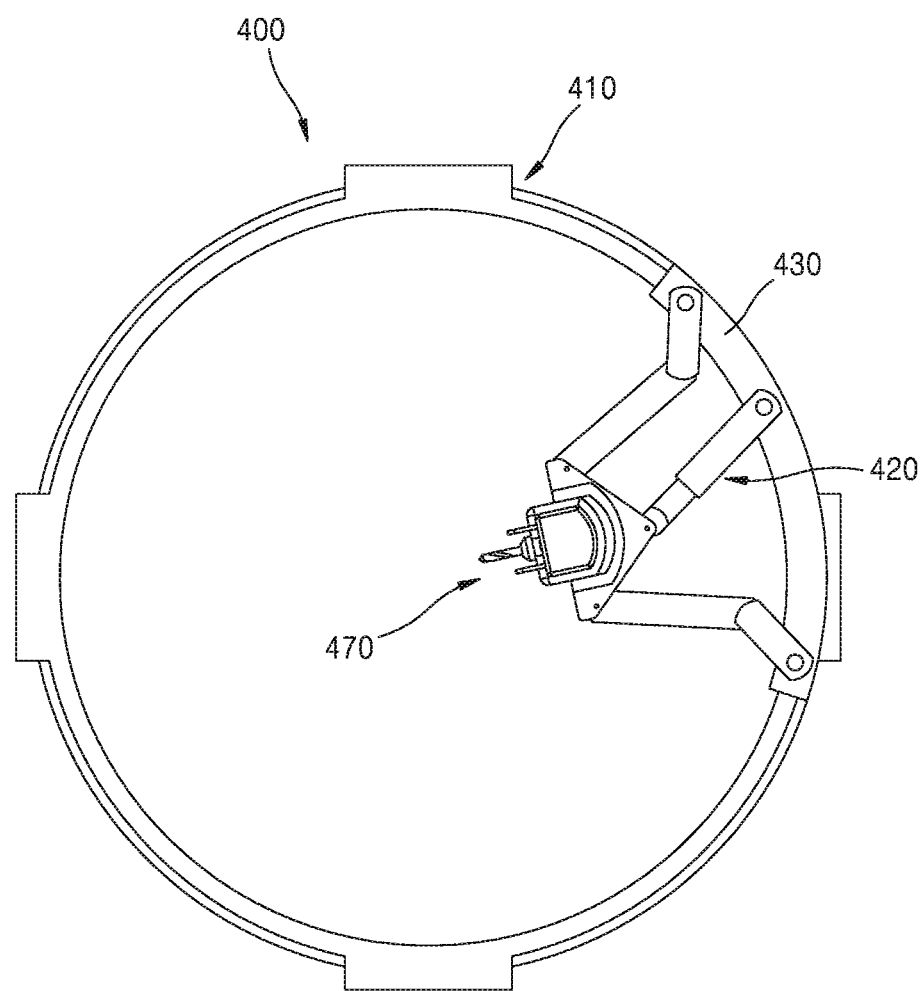
Figure 37:
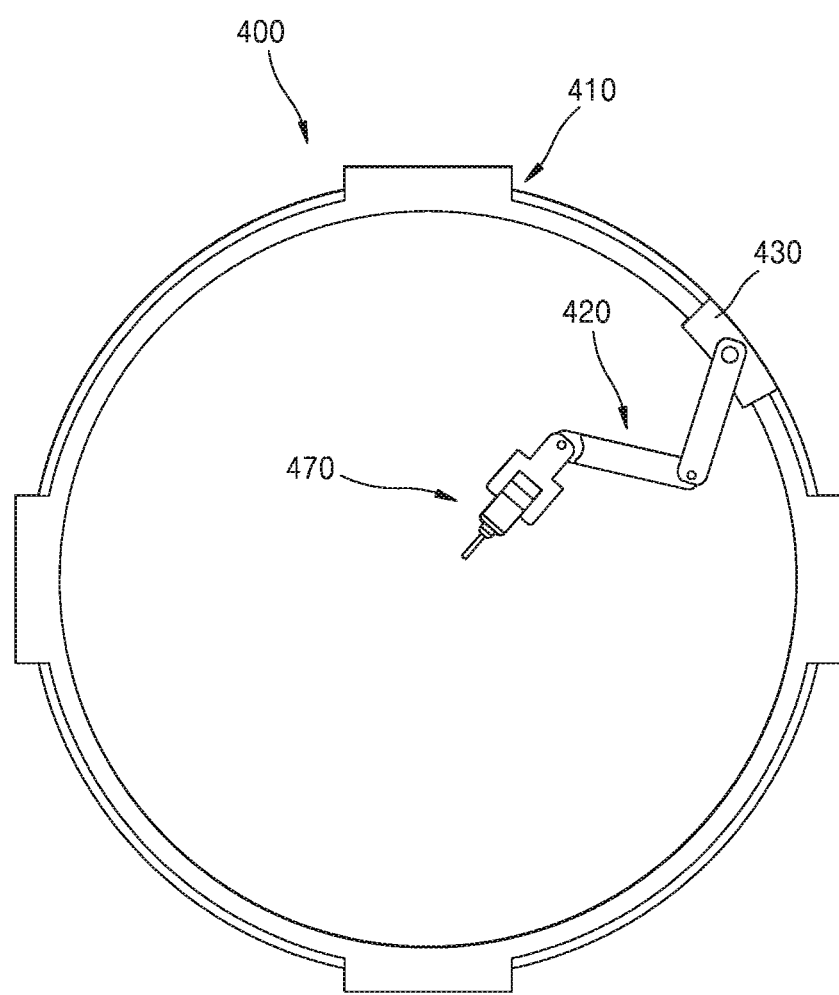

That is, as shown in FIGS. 33 to 35, the cutting device 470 includes the housing 472 connected to the legs, and the cutting tool 474 performing cutting and grinding operations is connected to the housing 472 in a vertically rotatable manner. Therefore, a cutting or grinding operation may be performed within a wide range.

For example, the cutting device 470 may be moved to a target position on a plane by rotations of the links of the legs, and the cutting tool 474 of the cutting device 470 may be vertically rotated to selectively perform a cutting or grinding operation at the target position.

The cutting tool 474 may include a cutting bit 476 used for cutting and an air blowers 478 for blowing air. That is, as shown in FIGS. 33 and 35, in addition to the cutting bit 476 rotated for cutting and grinding, the air blowers 478 is provided to blow air to a cutting position. Therefore, scraps or burrs may be easily removed during cutting and grinding.

FIGS. 35 to 39 are views illustrating the cutting unit 400 of the 3D printer 1 having a dual stage structure according to other exemplary embodiments.

The connection unit 420 is not limited the above-described structure. For example, the connection unit 420 may have a multi-joint structure formed by legs having a plurality of links. For example, referring to FIG. 34, all of the legs of the connection unit 420 have a multi-joint structure having a plurality of links.

In another example, at least one of the legs of the connection unit 420 may have a variable length. For example, referring to FIG. 36, one of the legs of the connection unit 420 has a variable length.

In another example, the connection unit 420 may have a single leg formed by a plurality of rotatable links connected in series. For example, referring to FIG. 37, a single leg includes a plurality of rotatable links connected in series.

The above-examples are for illustrative purposes only. That is, the connection unit 420 may have various structures.

Figure 38:
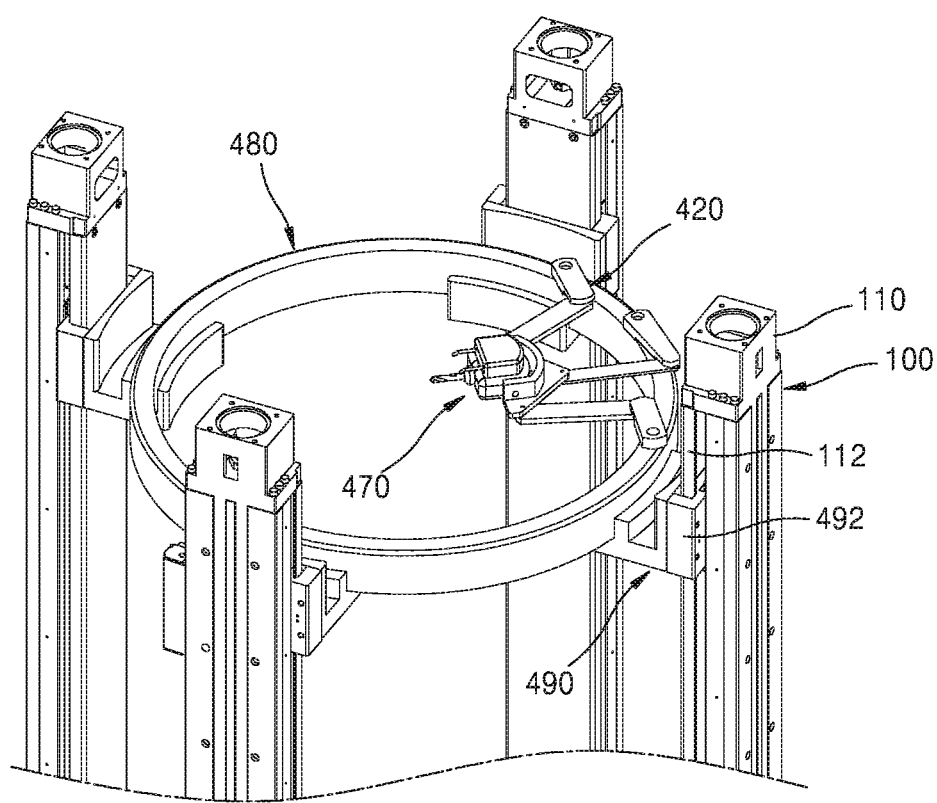
Figure 39:
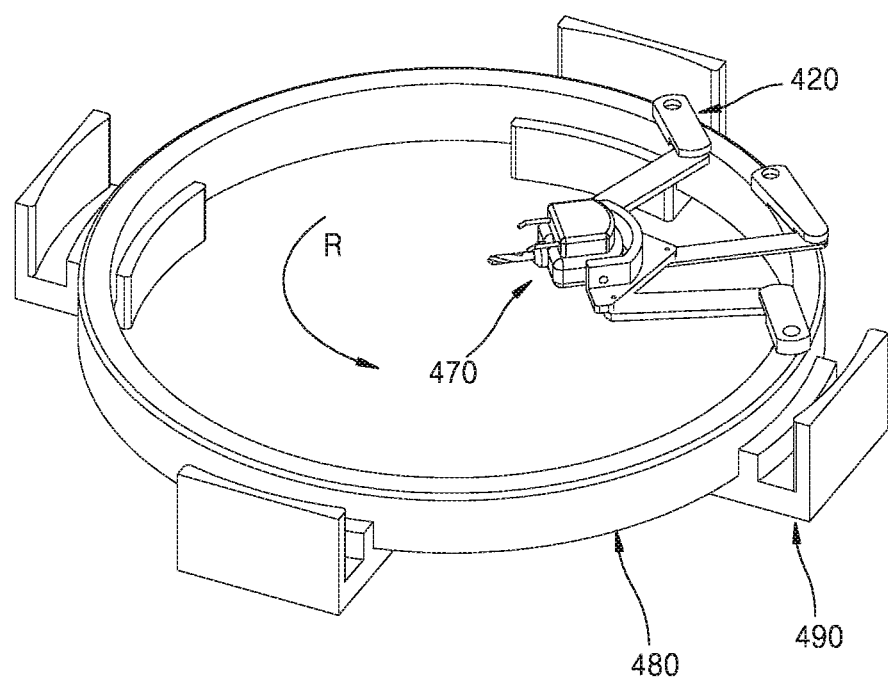
Figure 40:
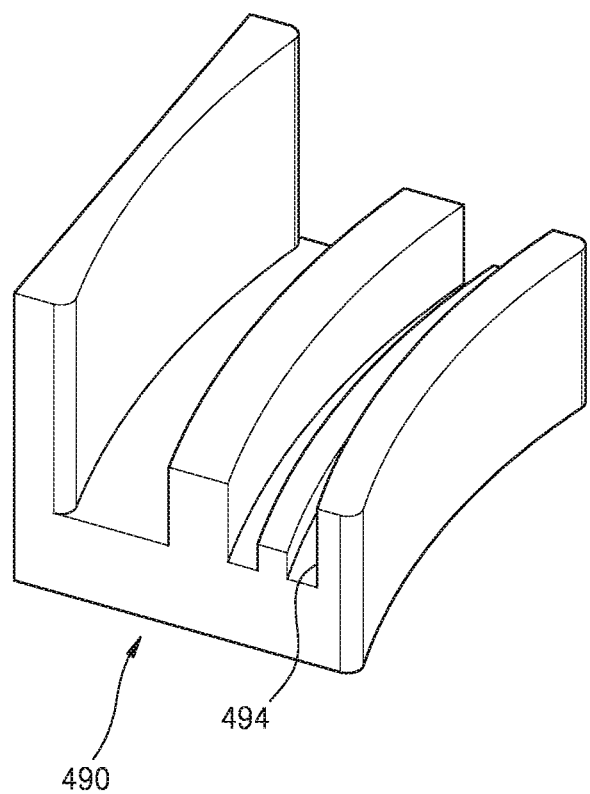
FIG. 40 illustrates a bracket of the stacking base unit of the 3D printer having a dual stage structure according to an exemplary embodiment.

FIGS. 38 and 39 illustrate the cutting unit 400 according to another exemplary embodiment. FIG. 40 illustrates a bracket 490 used in the other exemplary embodiment.

According to the other exemplary embodiment, the cutting unit 400 may include: a ring-shaped jig 480 having a center axis and a predetermined radius, wherein a space 482 is formed in the ring-shaped jig 480; and a plurality of brackets 490 connected to outer portions of the ring-shaped jig 480 in radial directions so as to allow the ring-shaped jig 480 to rotate around the center axis of the ring-shaped jig 480.

The cutting device 470 is disposed in the space 482, and the connection unit 420 connects the ring-shaped jig 480 and the cutting device 470.

Like the third jig 410, the ring-shaped jig 480 has a circular ring shape having a center axis and a predetermined radius. Instead of directly connecting the ring-shaped jig 480 to the frame 100, the ring-shaped jig 480 is connected to the frame 100 using the brackets 490. In detail, the brackets 490 are connected to the frame 100, and the ring-shaped jig 480 is connected to brackets 490.

The brackets 490 are respectively connected to the main guide beams 110 of the frame 100. The brackets 490 include second main guide parts 492 formed on outer portions thereof and connected to the main guide rails 112 of the frame 100 so that the brackets 490 may be vertically moved along the main guide rails 112.

The brackets 490 are connected to the outer portions of the ring-shaped jig 480 in radial directions so that the ring-shaped jig 480 may be rotatable on the center axis of the ring-shaped jig 480. That is, the brackets 490 are connected to the outer portions of the ring-shaped jig 480 in radial directions for supporting the ring-shaped jig 480 while allowing rotation of the ring-shaped jig 480.

To this end, the brackets 490 may include curved guide rails 494 formed inner portions of the brackets 490 and connected to the ring-shaped jig 480. The curved guide rails 494 have a radius of curvature the same as that of the ring-shaped jig 480 so that the ring-shaped jig 480 may be rotatable along the curved guide rails 494. That is, for example, grooves having a predetermined radius of curvature may be formed in the brackets 490 to form the curved guide rails 494, and the ring-shaped jig 480 may be connected to the curved guide rails 494 by placing portions of the ring-shaped jig 480 on the curved guide rails 494. Therefore, in a state in which the ring-shaped jig 480 is connected to the curved guide rails 494, the ring-shaped jig 480 may be rotated as indicated by an arrow R in FIG. 39.

The shapes and arrangement of the stacking base unit 200, the extrusion unit 300, the cutting unit 400, and the frame 100 are not limited to the above-described shapes and arrangement. That is, as shown in FIGS. 41 to 48, the third jig 410 of the cutting unit 400 may have a shape other than the above-mentioned circular shape, such as a polygonal or elliptical shape. The same applies to the stacking base unit 200 and the extrusion unit 300. Accordingly, the shape and configuration of the frame 100 may be variously varied. For example, if the stacking base unit 200 and the cutting unit 400 have a rectangular shape, the frame 100 may be disposed at positions corresponding to sides of the rectangular shape. In this case, objects having a rectangular or similar shape may be easily formed, and spaces of the 3D printer 1 may be selectively used.

Figure 41:
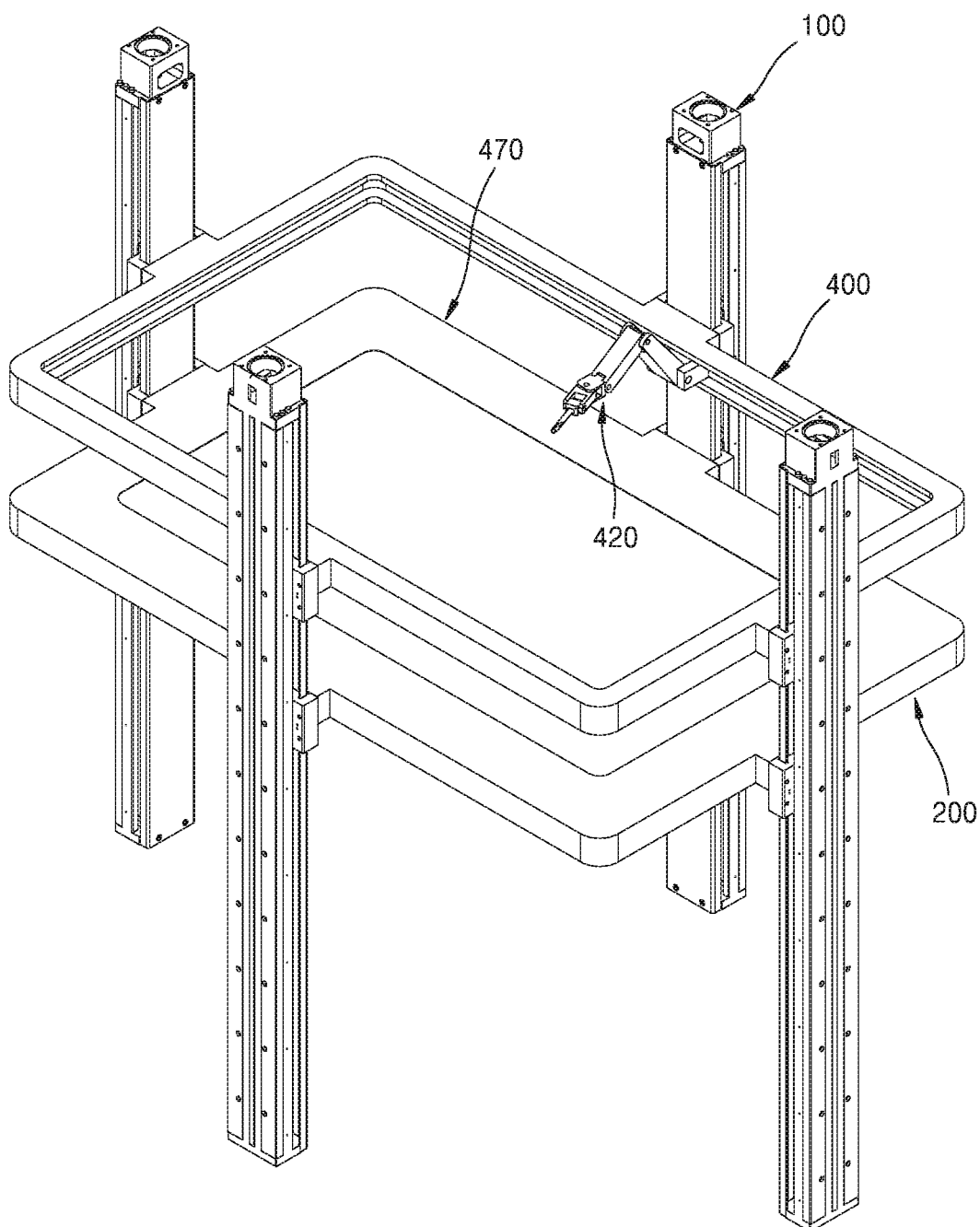
FIGS. 41 to 48 illustrate the 3D printer having a dual stage structure according to another exemplary embodiment.
Figure 42:
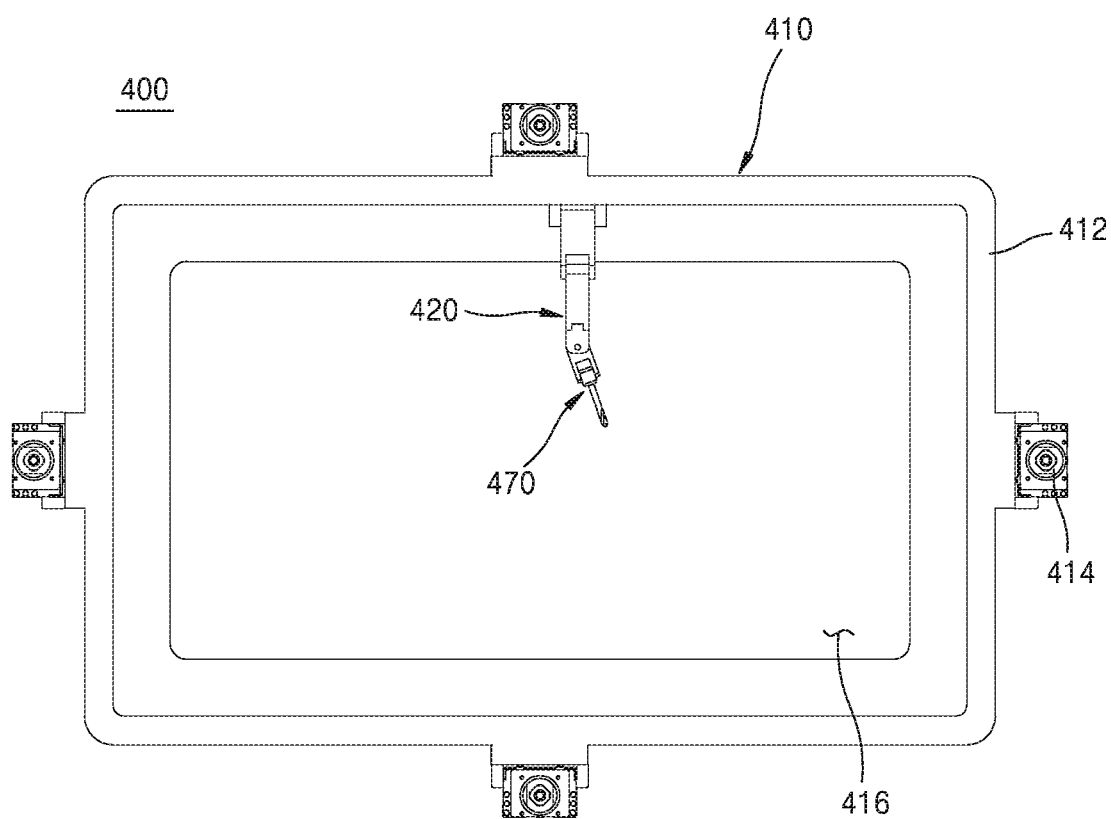
Figure 43:
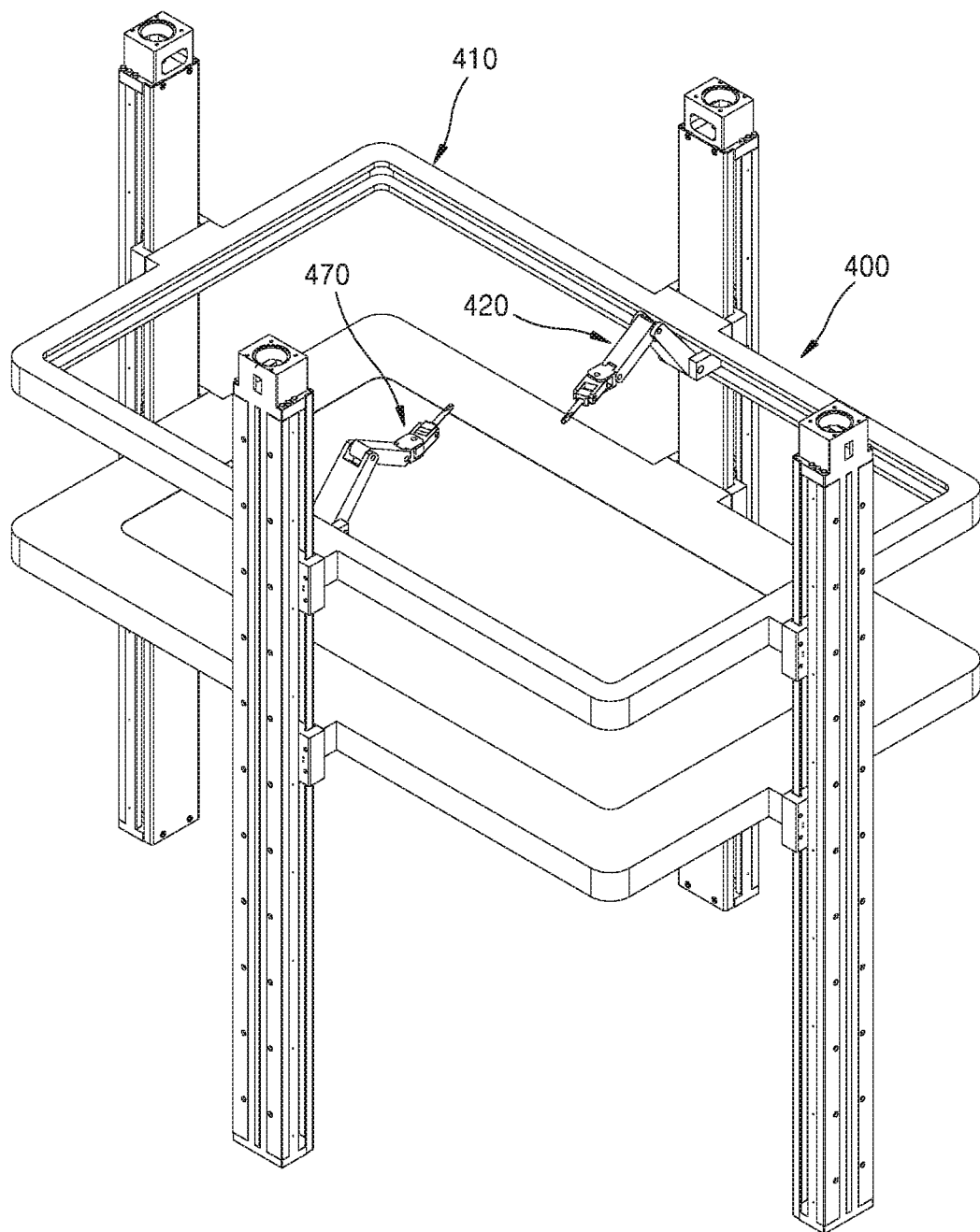
Figure 44:
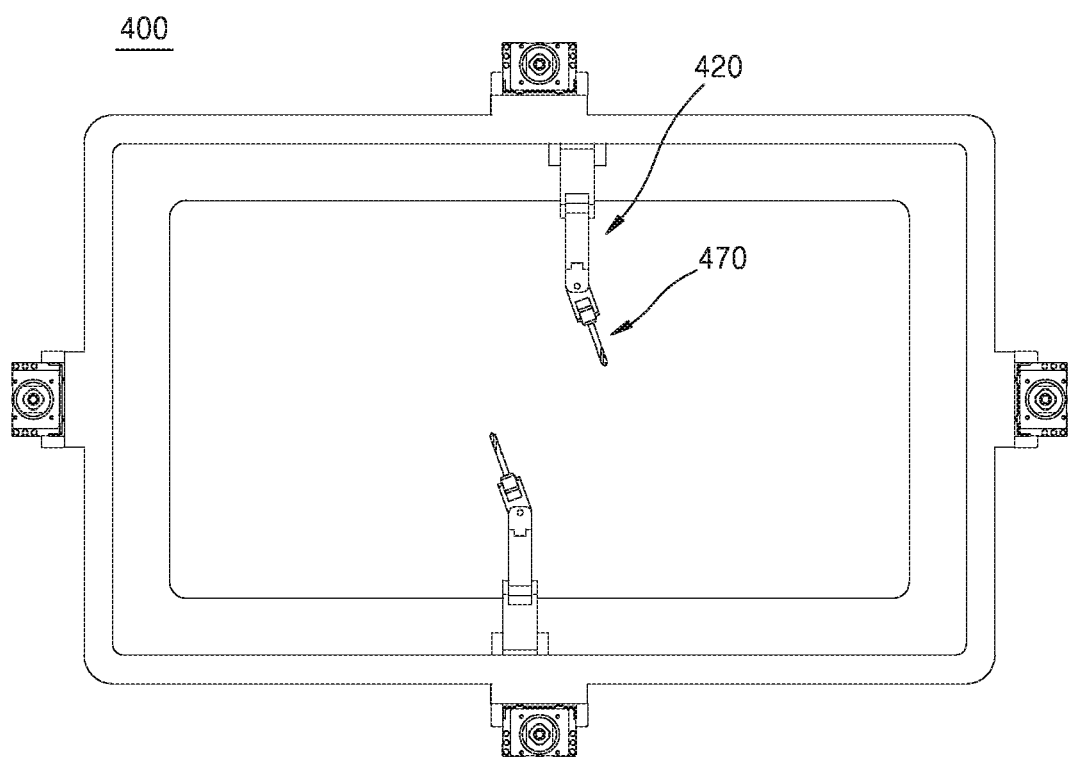
Figure 45:
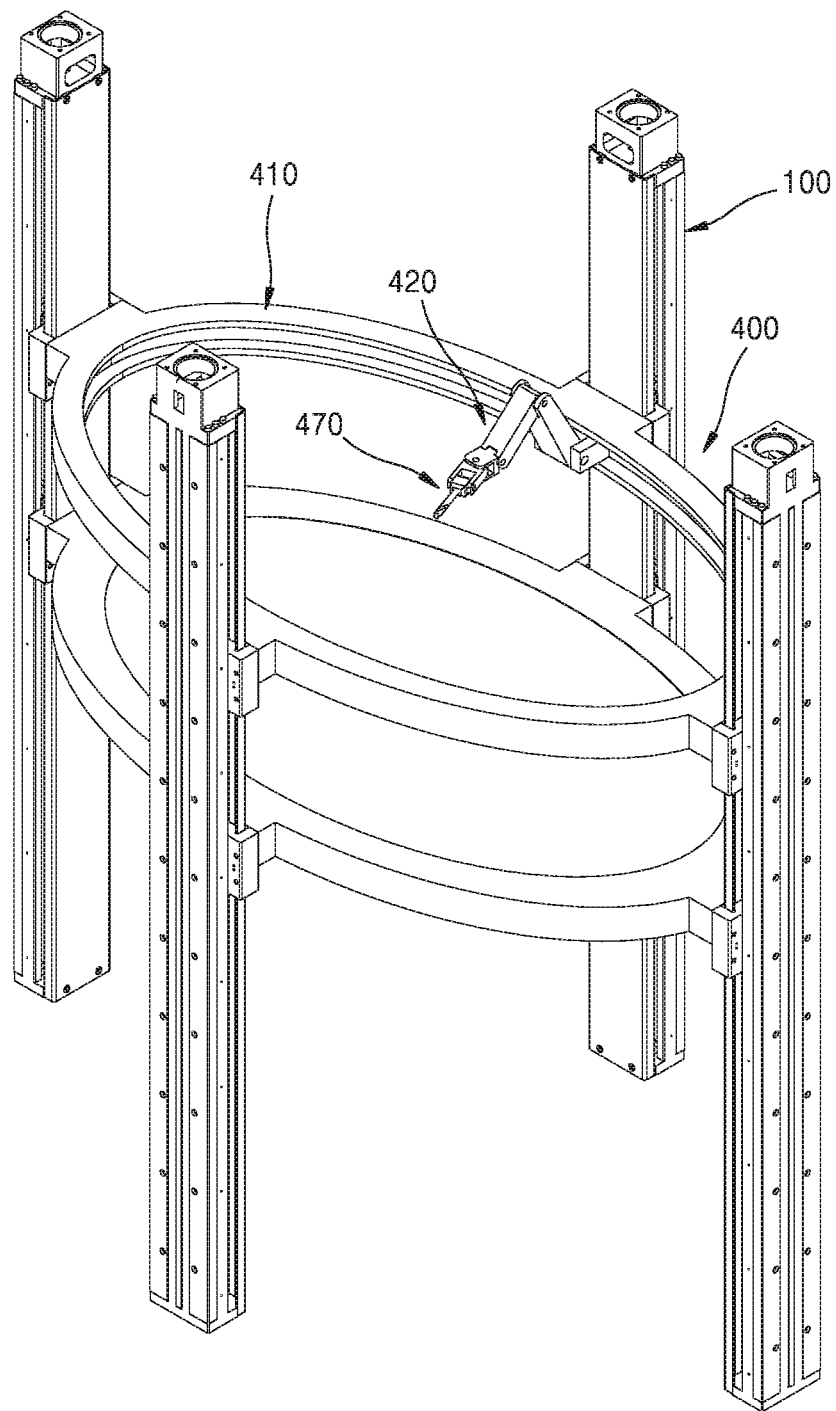
Figure 46:
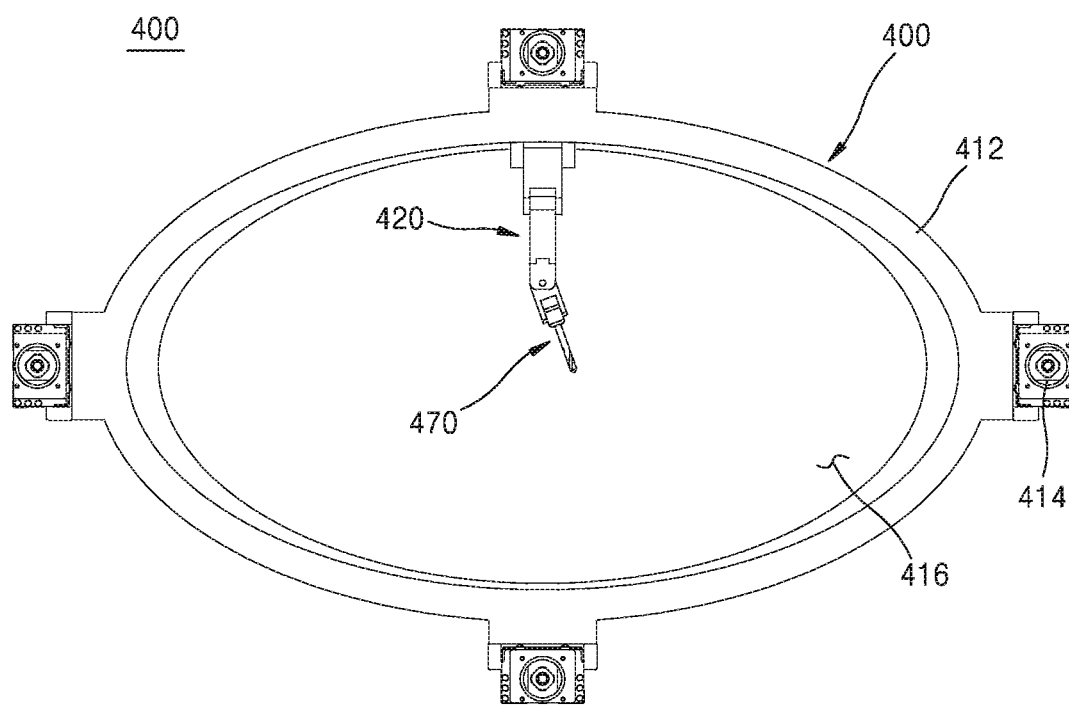
Figure 47:
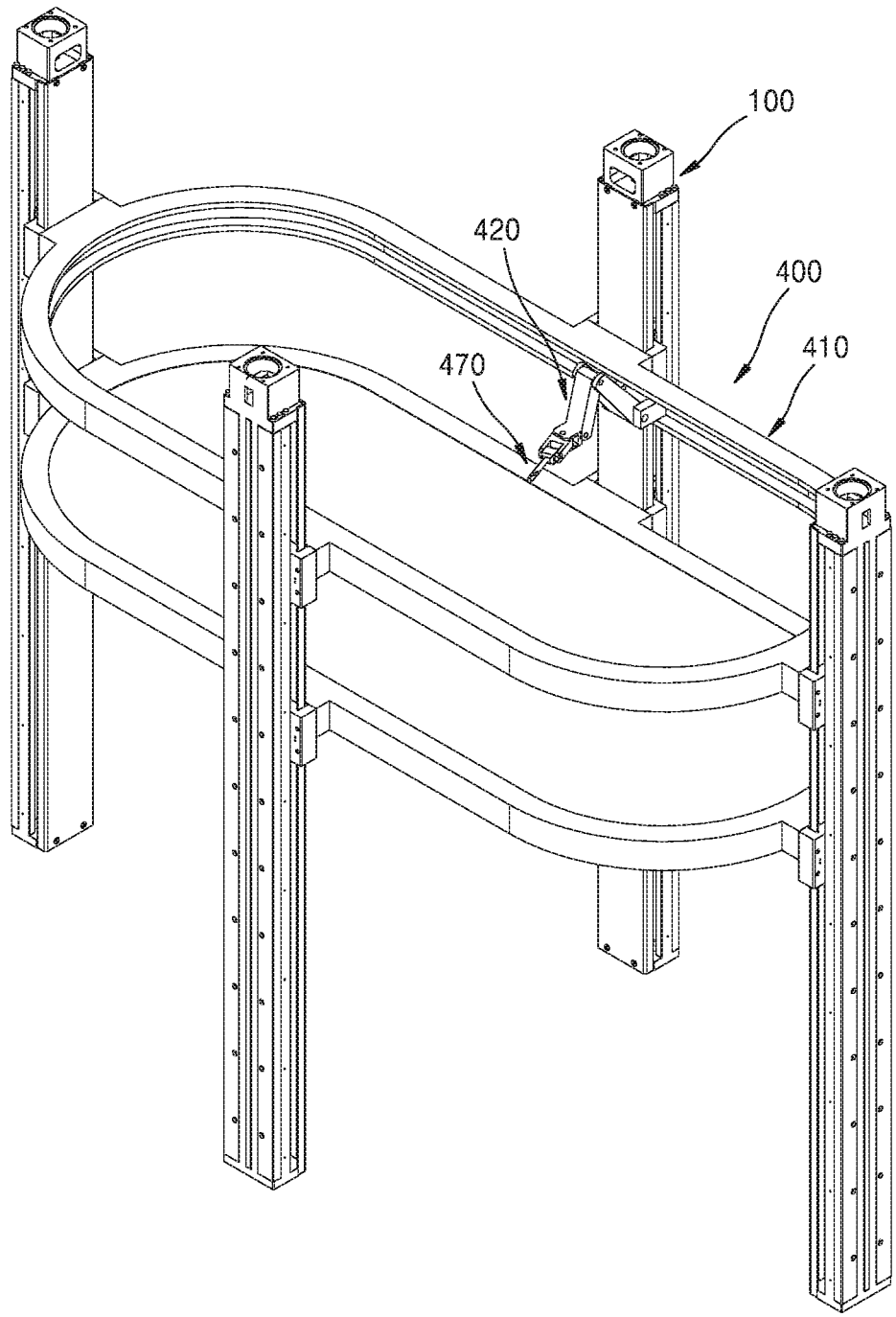
Figure 48:
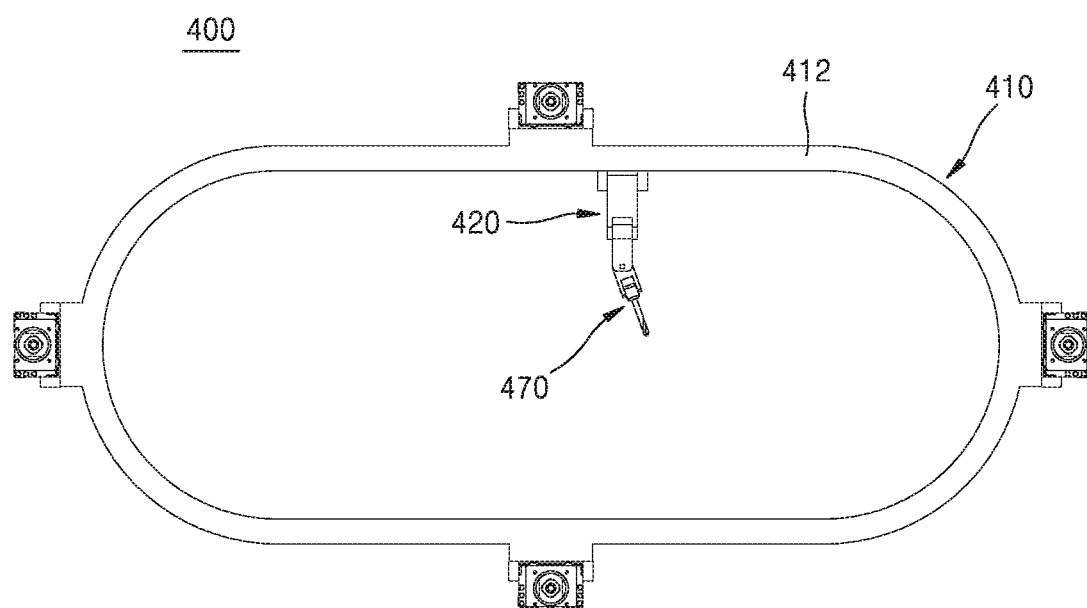

In addition, the structures of the cutting device 470 and the connection unit 420 of the cutting unit 400 may be variously varied. For example, as shown in FIGS. 41 and 48, a multi-joint series connection type connection unit 420 may be used, and thus the movement of the connection unit 420 may be three-dimensional as well as two-dimensional. Furthermore, other rotation mechanisms such as rotatable joints may be used in addition to hinges for variously moving the connection unit 420. Therefore, various portions may be cut and ground using the cutting unit 400. In addition, a plurality of cutting devices 470 and a plurality of connection units 420 may be used to perform cutting and grinding operations within predetermined ranges.

Hereinafter, a method of manufacturing a target object using the 3D printer 1 having a dual stage structure will be described according to an exemplary embodiment with reference to the accompanying drawings.

Figure 49:
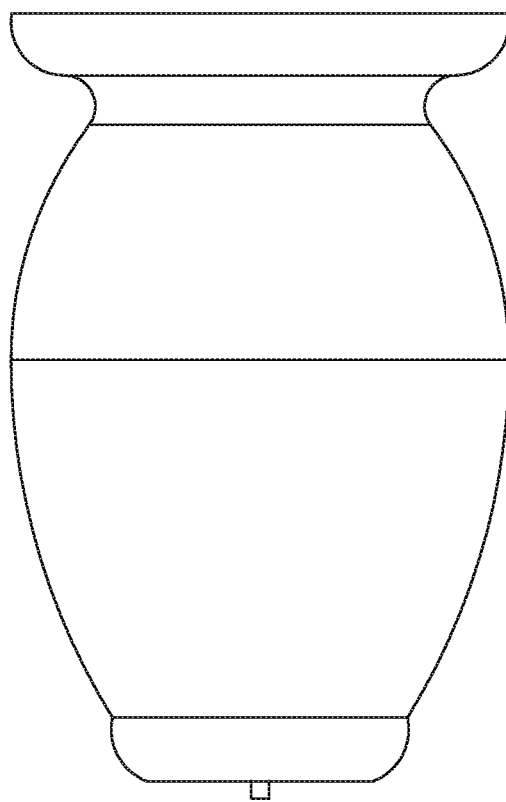
FIG. 49 illustrates an exemplary target object to be formed using the 3D printer having a dual stage structure.
Figure 58:
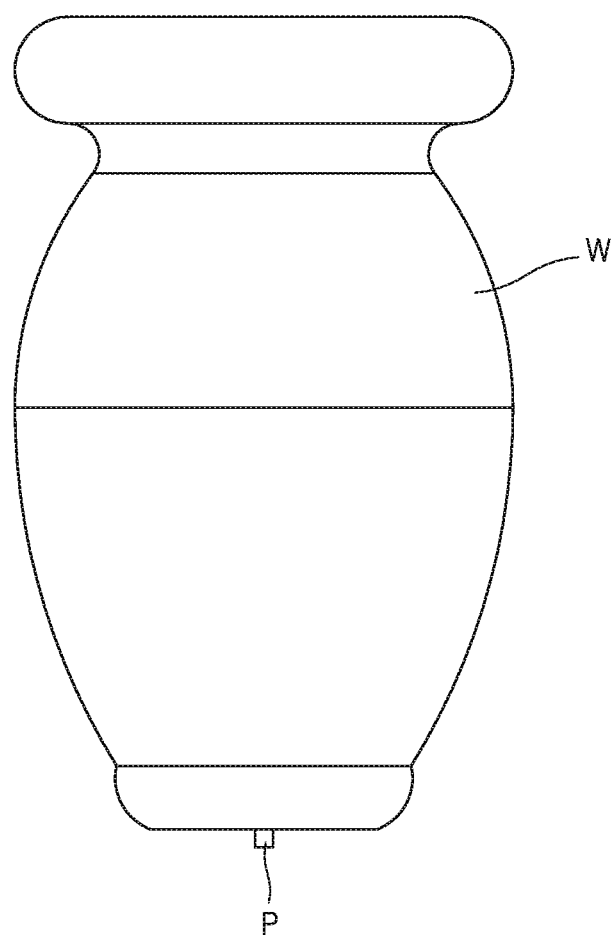
FIG. 58 illustrates an exemplary object formed using the 3D printer having a dual stage structure according to the exemplary embodiment.

FIG. 49 is a view illustrating an exemplary object to be formed using the 3D printer 1 having a dual stage structure according to an exemplary embodiment. FIGS. 50 to 57 are views illustrating processes for forming an object using the 3D printer 1 having a dual stage structure according to the exemplary embodiment. FIG. 58 is a view illustrating an exemplary object formed using the 3D printer 1 having a dual stage structure according to the exemplary embodiment.

In the exemplary embodiment, a target object W as shown in FIG. 49 is manufactured using the 3D printer 1 having a dual stage structure.

Figure 50:
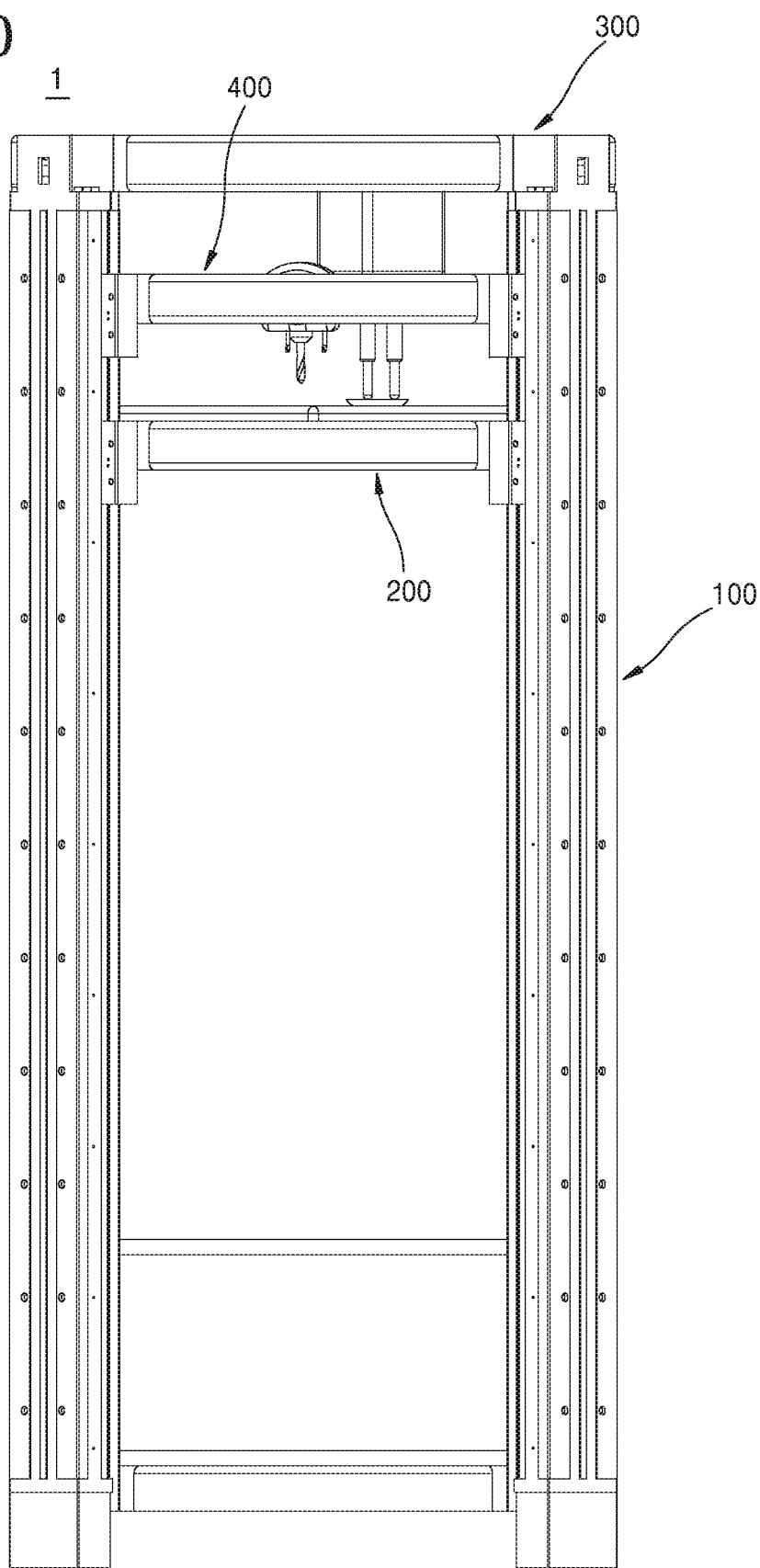
FIGS. 50 to 57 illustrate processes for forming a target object using the 3D printer having a dual stage structure according to an exemplary embodiment.
Figure 51:
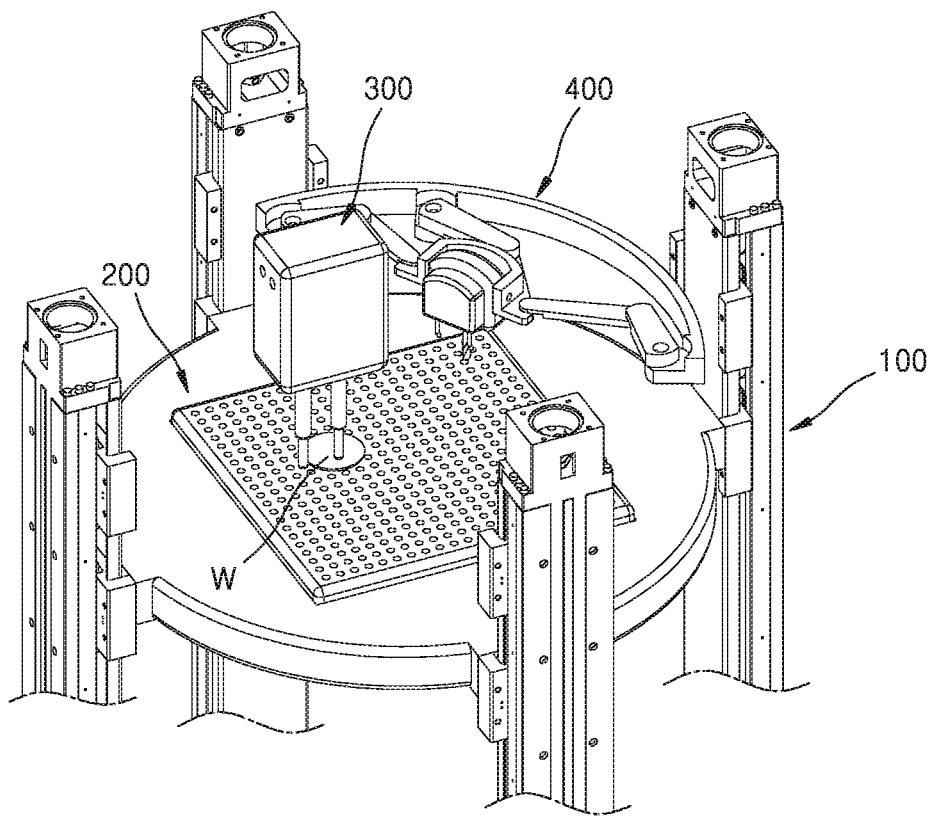
Figure 52:
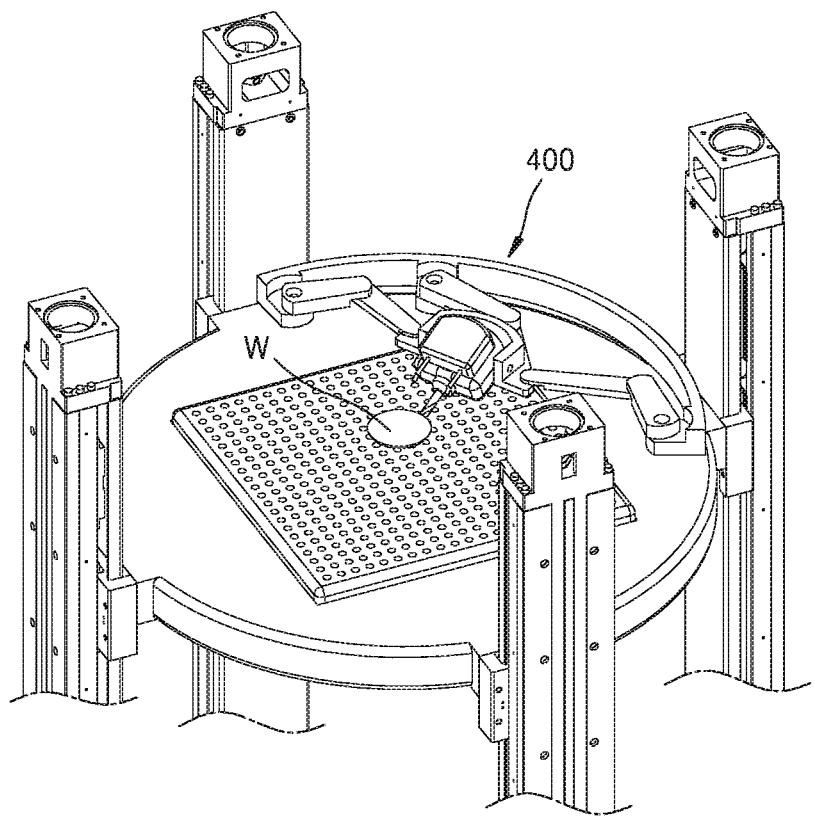
Figure 53:
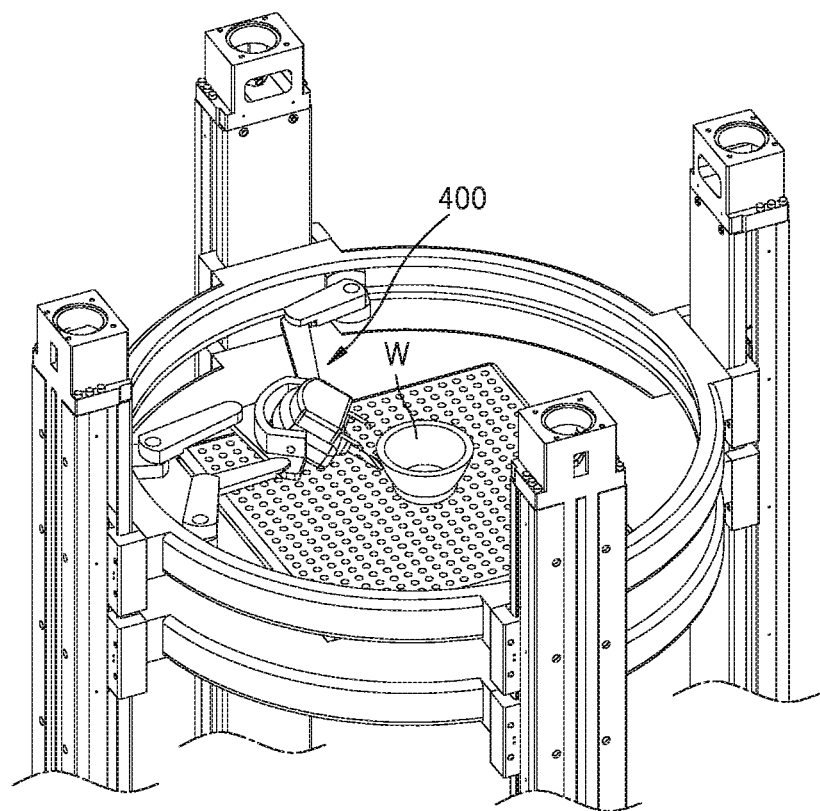
Figure 54:
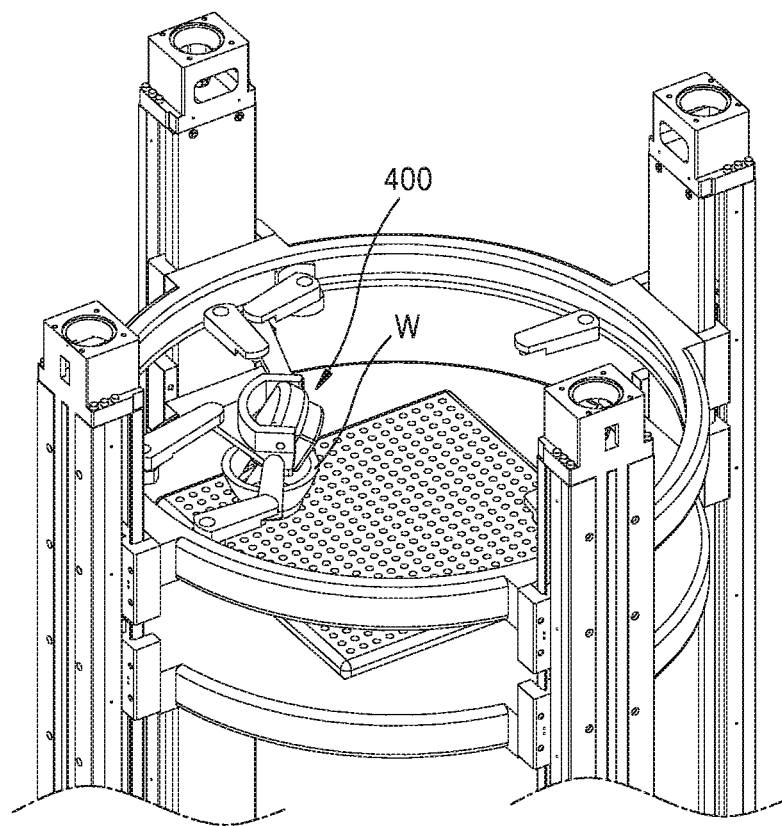
Figure 55:
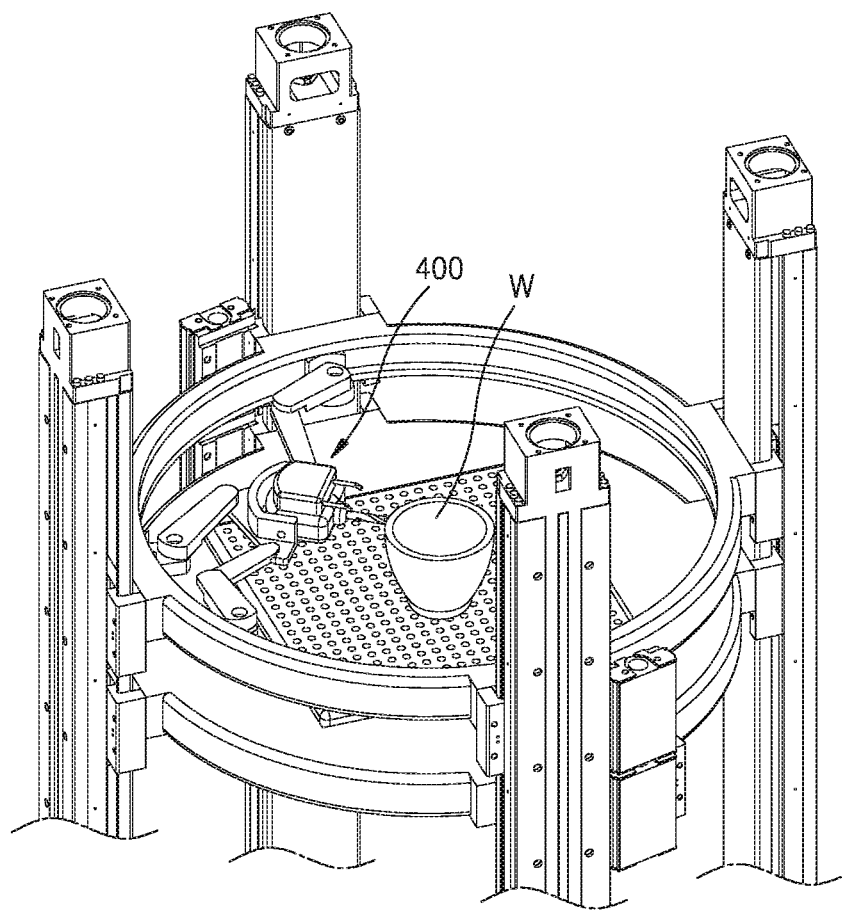
Figure 56:
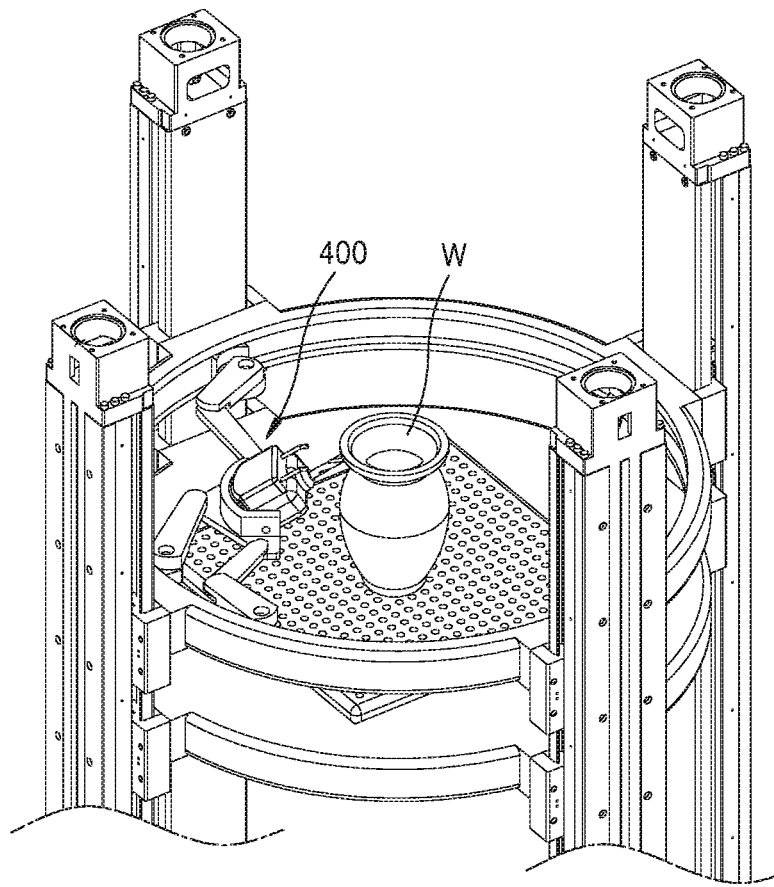
Figure 57:
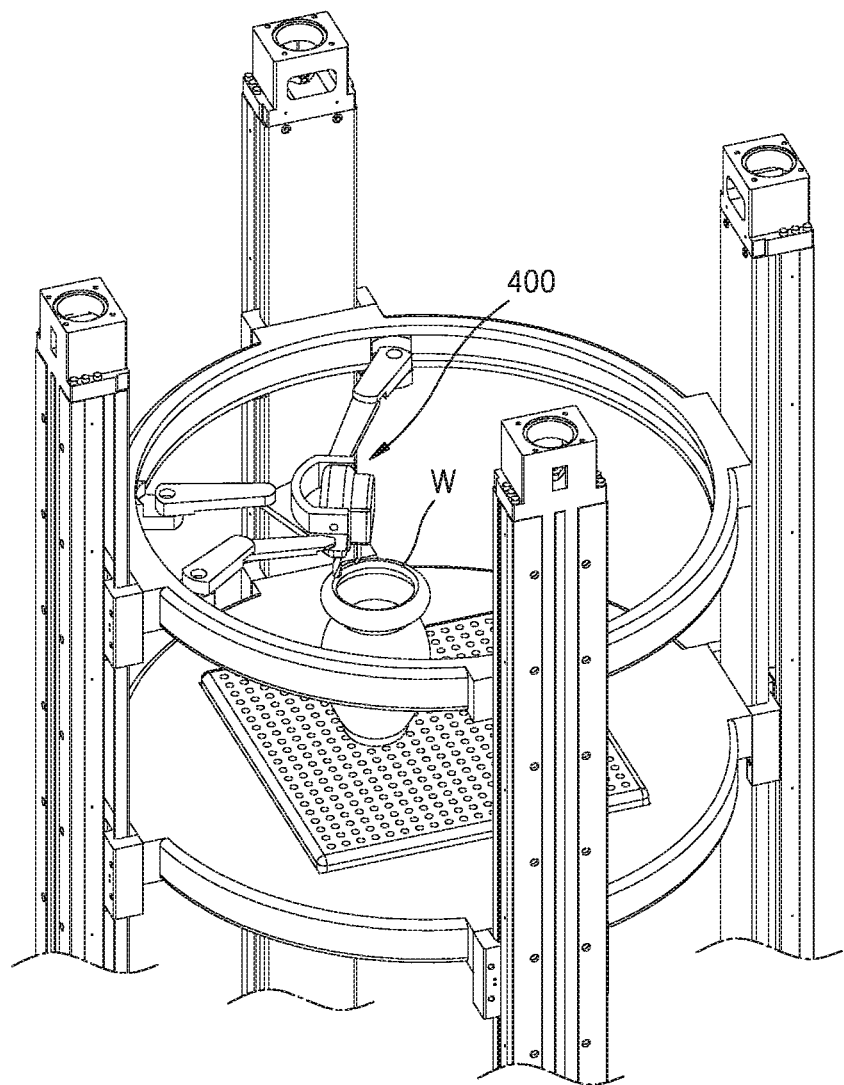

First, as shown in FIG. 50, the stacking base unit 200 and the cutting unit 400 are placed at initial positions. At this time, the stacking base unit 200 is disposed close to the extrusion unit 300, and a raw material is extruded onto the bed 220 of the stacking base unit 200.

At this time, as described above, the raw material is first filled in the support holes 222 formed in the bed 220 so that an object formed successively may be supported and fixed by the support holes 222. Therefore, the resultant object successively formed as described above may have protrusion tips P on an end thereof as shown in FIG. 58. In this manner, an object formed using the 3D printer 1 having a dual stage structure of the exemplary embodiment may be simply and easily supported, and even though the object receives force during a cutting process, the object may be kept in place. Therefore, the object may be formed more in accordance with aimed purposes.

Thereafter, as shown in FIGS. 51 to 57, while the raw material is extruded from the extrusion unit 300, the stacking base unit 200 is moved downward, and the cutting unit 400 performs cutting and grinding operations. At this time, the nozzle 340 of the extrusion unit 300 is moved to vary the position where the raw material is extruded, and since the stacking base unit 200 is moved downward, the raw material may be properly deposited layer-by-layer. In addition, since the cutting unit 400 performs cutting and grinding operations, the object may be formed more in accordance with aimed purposes.

As described above, according to the one or more of the above exemplary embodiments, an object may be formed while the object is simply and easily supported, and even though the object receives force during a cutting process, the object may be kept in place. Therefore, the object may be formed more in accordance with aimed purposes.

In addition, when the raw material is extruded through the extrusion unit, the cutting unit performs cutting and grinding operations simultaneously with the extrusion of the raw material. Therefore, since the cutting unit performs cutting and grinding operations at the same time while the raw material is deposited layer-by-layer, an object may be rapidly formed.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A 3D printer having a dual stage structure, the 3D printer comprising:
   an extrusion unit configured to extrude a raw material;
   a stacking base unit positioned under the extrusion unit and configured to stack the raw material on an upper surface thereof so that an object is formed;
   a cutting unit between the stacking base unit and the extrusion unit and configured to grind or cut the object formed on the upper surface of the stacking base unit, and
   a frame positioned outside the extrusion unit, the cutting unit, and the stacking base unit,
   wherein the frame comprises a plurality of main guide beams, the main guide beams being arranged spaced apart from each other and extending vertically and parallel to each other, wherein the extrusion unit, the cutting unit, and the stacking base unit are connected to one or more of the plurality of main guide beams,
   wherein the cutting unit is configured to be vertically movable along the main guide beams, at least one of the extrusion unit and the stacking base unit is configured to be vertically movable along the main guide beams, a distance between the extrusion unit and the cutting unit and a distance between the cutting unit and the stacking base unit are variable relative to each other,
   wherein the cutting unit comprises:
   a jig configured to be vertically movable along the plurality of main guide beams and having a space therein;
   a cutting device positioned in the space of the jig; and
   a connection unit configured to connect the jig and the cutting device,
   wherein the connection unit comprises one or more legs having a variable structure such that the cutting device is movable in the space of the jig, and
   wherein the stacking of the raw material on the upper surface of the stacking base unit by using the extrusion unit and the grinding or cutting of the raw material stacked on the stacking base unit by using the cutting unit are capable of being performed simultaneously.

2. The 3D printer of claim 1, wherein main guide rails extending vertically are respectively formed on inner sides of the plurality of main guide beams,
   the jig comprises a main guide part, the main guide part being formed on an outer portion of the jig and connected to the plurality of main guide rails, and
   the cutting unit is configured to be vertically movable along the plurality of main guide rails.

3. The 3D printer of claim 2, wherein the jig further comprises an inner guide rail formed along an inner circumference of the jig,
   the connection unit further comprises an inner guide part configured to be connected to the inner guide rail and movable along the inner guide rail,
   the one or more legs are configured to be connected to the inner guide part, and
   the cutting device is configured to move in the space of the jig according to a movement of the inner guide part.

4. The 3D printer of claim 3, wherein the jig has a ring shape with a predetermined radius of curvature such that the space therein has a circular shape,
   the inner guide rail is formed along the inner circumference of the jig and has a predetermined radius of curvature, and
   the inner guide part has a radius of curvature that is the same as the radius of curvature of the inner guide rail such that the inner guide part is movable along the inner guide rail.

5. The 3D printer of claim 4, wherein each of the one or more legs comprises a single link or a plurality of links connected in series, the single link or the plurality of links being configured to extend a predetermined length and connect the inner guide part and the cutting device, and ends of the plurality of links are configured to be connected to each other and rotatable on a plane within the space of the jig such that the cutting device is movable on the plane.

6. The 3D printer of claim 4, wherein the one or more legs of the connection unit comprises three or more legs, and one end of each of the three or more legs is configured to be connected to the cutting device and the other end of each of the three or more legs to the inner guide part in parallel.

7. The 3D printer of claim 4, wherein the one or more legs of the connection unit comprises a first leg, a second leg, and a third leg, the second leg is positioned between the first and third legs, the first leg comprises a first link and a second link configured to be rotatably connected to each other through a hinge, the second leg comprises a third link, and the third leg comprises a fourth link and a fifth link configured to be rotatably connected to each other via a hinge.

8. The 3D printer of claim 1, wherein at least one of the one or more legs has a variable length such that the cutting device is movable in the space of the jig.

* * * * *